United States Patent
Tsuruoka

(10) Patent No.: US 8,189,063 B2
(45) Date of Patent: May 29, 2012

(54) IMAGE PICKUP SYSTEM AND IMAGE PICKUP PROGRAM

(75) Inventor: Takao Tsuruoka, Machida (JP)

(73) Assignee: Olympus Corporation (JP)

(*) Notice: Subject to any disclaimer, the term of this patent is extended or adjusted under 35 U.S.C. 154(b) by 579 days.

(21) Appl. No.: 12/339,465

(22) Filed: Dec. 19, 2008

(65) Prior Publication Data
US 2009/0096889 A1  Apr. 16, 2009

Related U.S. Application Data

(63) Continuation of application No. PCT/JP2007/061893, filed on Jun. 13, 2007.

(30) Foreign Application Priority Data

Jun. 22, 2006 (JP) .................... 2006-172985

(51) Int. Cl.
H04N 5/228 (2006.01)
(52) U.S. Cl. .................................. 348/222.1
(58) Field of Classification Search ............ 348/222.1
See application file for complete search history.

(56) References Cited

U.S. PATENT DOCUMENTS 7,002,624 B1* 2/2006 Uchino et al. ............ 348/225.1
2004/0061902 A1* 4/2004 Tang et al. ................ 358/3.01
2008/0180535 A1* 7/2008 Habuka et al. ............ 348/208.4

FOREIGN PATENT DOCUMENTS

| JP | 2001-078202 | 3/2001 |
|----|-------------|--------|
| JP | 2002-232907 | 8/2002 |
| JP | 2003-274180 | 9/2003 |
| JP | 2004-186879 | 7/2004 |
| JP | 2005-311581 | 11/2005 |
| JP | 2006-014164 | 1/2006 |
| JP | 2006-023959 | 1/2006 |
| JP | 2006-090897 | 4/2006 |

OTHER PUBLICATIONS

International Search Report mailed Sep. 25, 2007 in corresponding PCT International Application No. PCT/JP2007/061893.

* cited by examiner

*Primary Examiner* — James Hannett
(74) *Attorney, Agent, or Firm* — Ostrolenk Faber LLP

(57) ABSTRACT

An image pickup system includes a verification unit for verifying a reliability related to a plurality of image signals obtained by an image-pickup operation performed by setting a spectral characteristic of a color image sensor system different; a correction unit for performing a correction processing on the plurality of image signals on the basis of the reliability; and an estimation unit for performing an estimation for an unknown spectral characteristic related to a subject or an illumination light on the basis of the plurality of image signals on which the correction processing is performed.

28 Claims, 20 Drawing Sheets

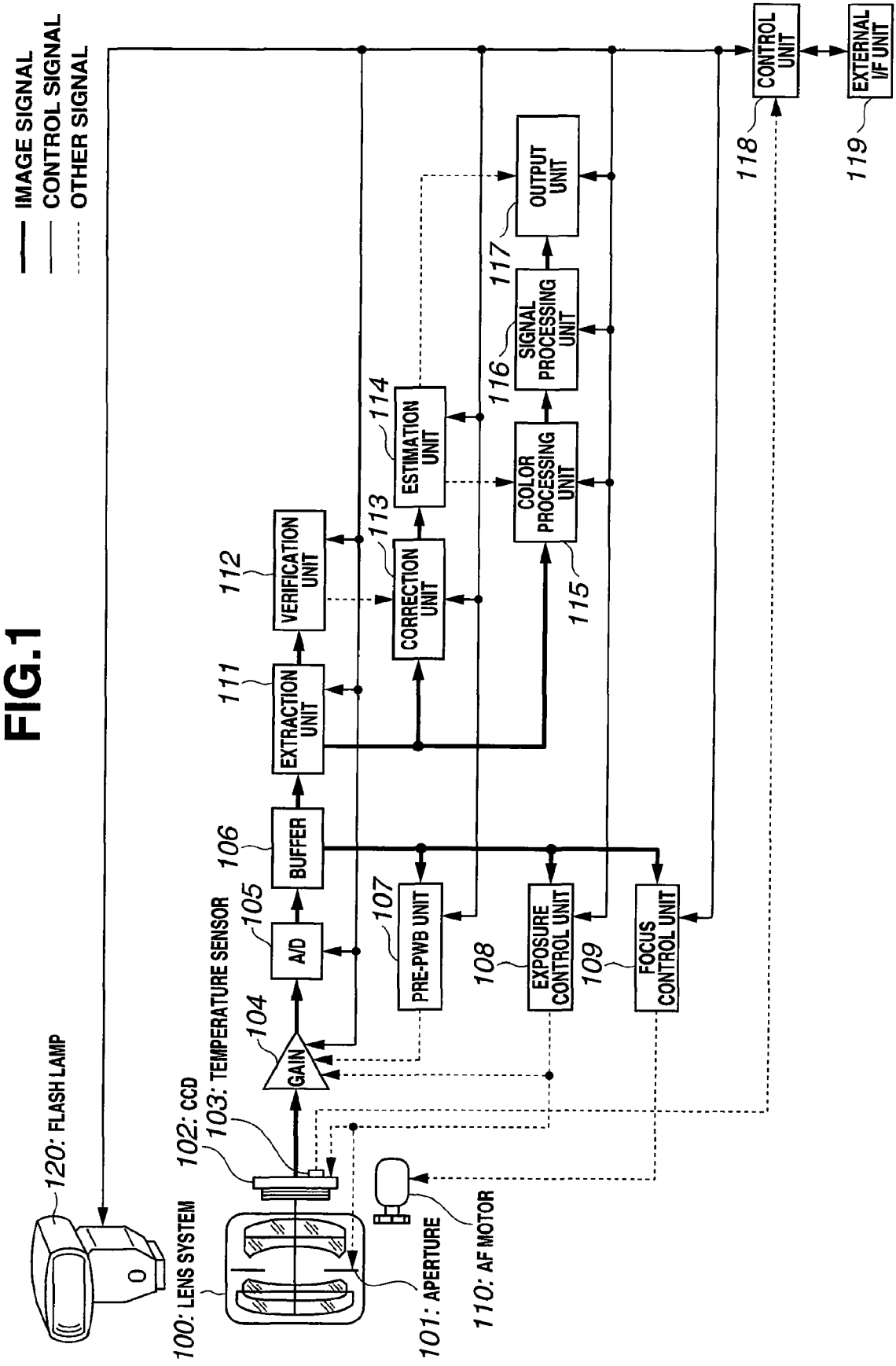

FIG.2A
NEIGHBORHOOD REGION — TARGET REGION
FIG.2B
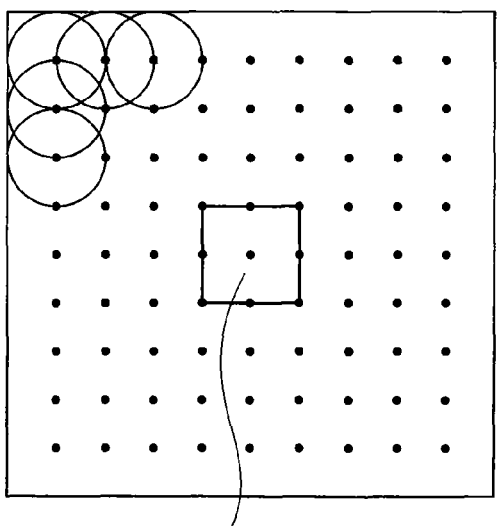
TARGET REGION
$Y = (Gr_{54} + Gb_{45}) / 2$
$Cb = B_{55} - (Gr_{54} + Gb_{45}) / 2$
$Cr = R_{44} - (Gr_{54} + Gb_{45}) / 2$
FIG.2C
NEIGHBORHOOD REGION — TARGET REGION
FIG.2D
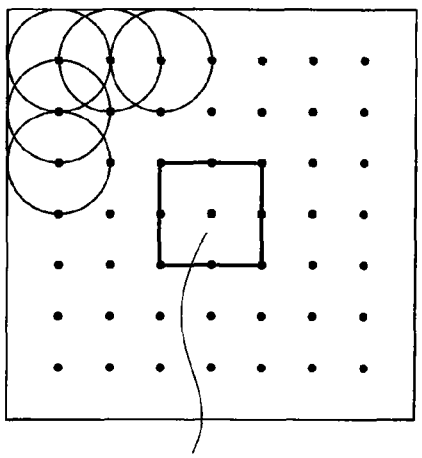
TARGET REGION
$Y = Cy_{44} + Ye_{34} + Mg_{43} + G_{33}$
$Cb = (Cy_{44} + Mg_{43}) - (Ye_{34} + G_{33})$
$Cr = (Ye_{34} + Mg_{43}) - (Cy_{44} + G_{33})$

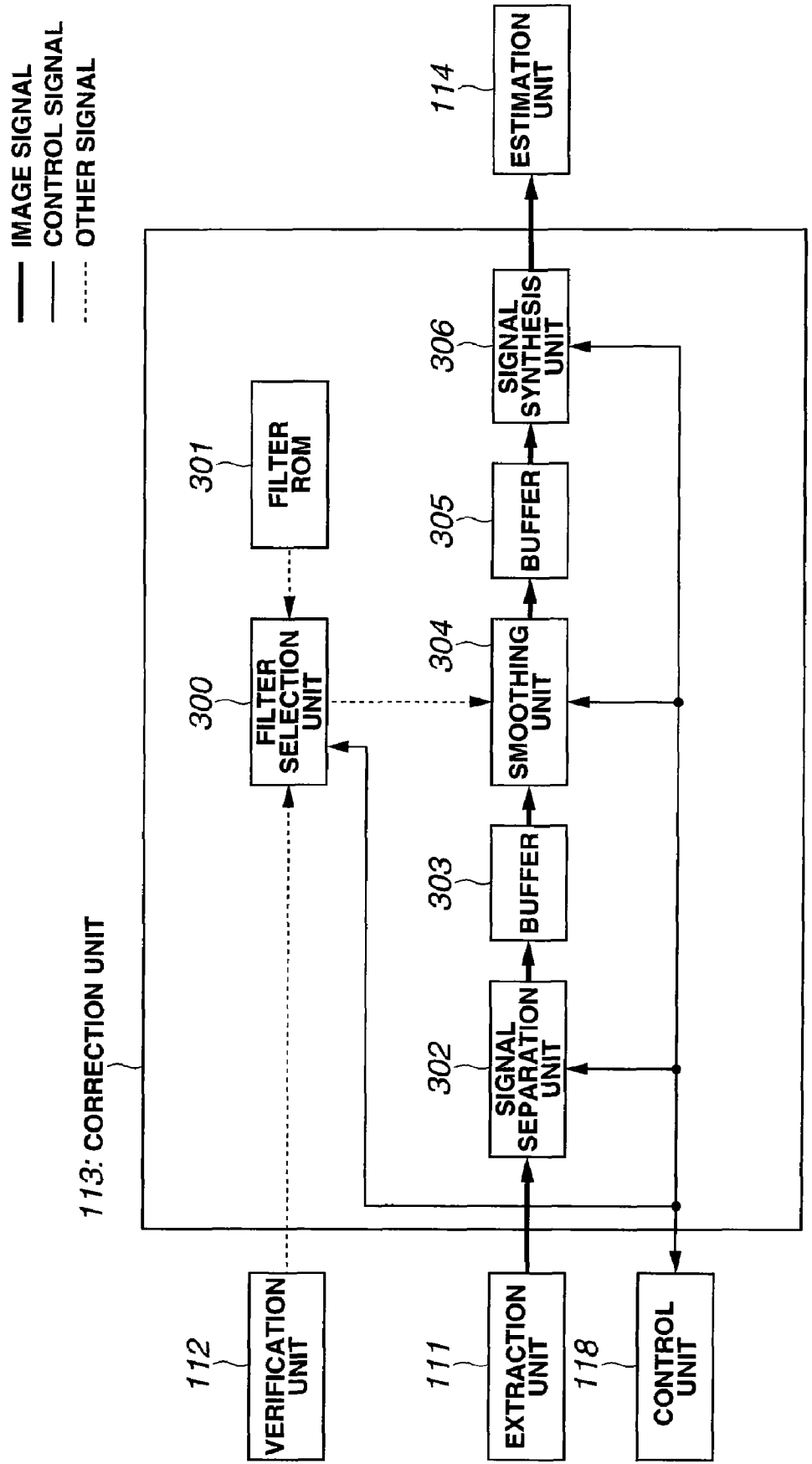

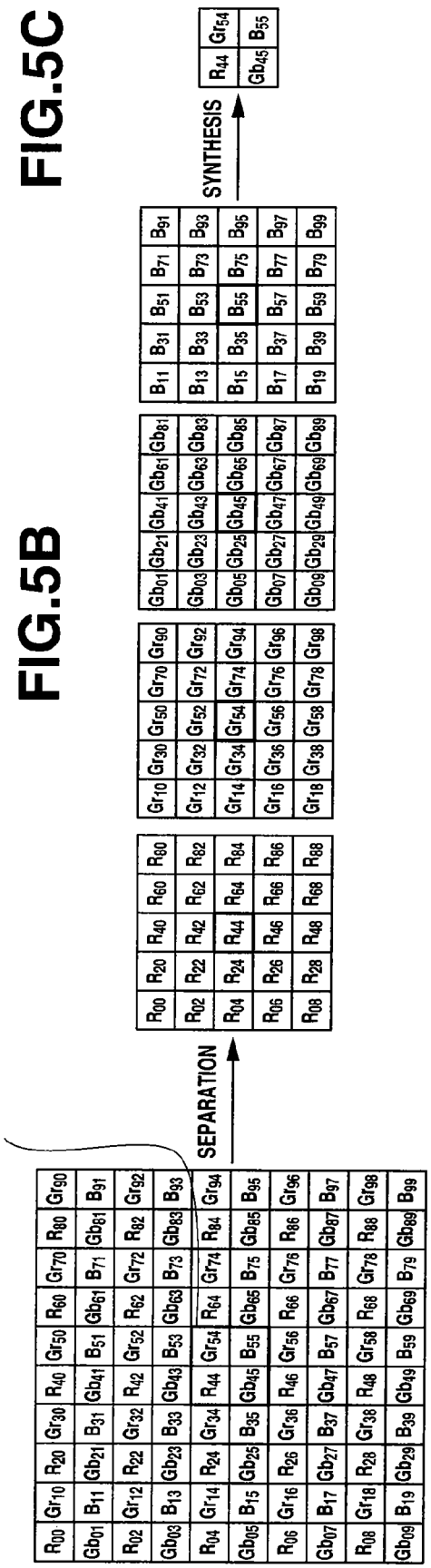

FIG.6A
| 0 | 0  | 2  | 0  | 0 |
|---|----|----|----|---|
| 0 | 7  | 15 | 7  | 0 |
| 0 | 15 | 32 | 15 | 0 |
| 0 | 7  | 15 | 7  | 0 |
| 0 | 0  | 2  | 0  | 0 |
FIG.6B
| 0 | 1  | 2  | 1  | 0 |
|---|----|----|----|---|
| 1 | 7  | 14 | 7  | 1 |
| 2 | 14 | 28 | 14 | 2 |
| 1 | 7  | 14 | 7  | 1 |
| 0 | 1  | 2  | 1  | 0 |
FIG.6C
| 1 | 1  | 2  | 1  | 1 |
|---|----|----|----|---|
| 1 | 8  | 13 | 8  | 1 |
| 2 | 13 | 23 | 13 | 2 |
| 1 | 8  | 13 | 8  | 1 |
| 1 | 1  | 2  | 1  | 1 |
FIG.6D
| 1 | 2  | 3  | 2  | 1 |
|---|----|----|----|---|
| 2 | 8  | 11 | 8  | 2 |
| 3 | 11 | 20 | 11 | 3 |
| 2 | 8  | 11 | 8  | 2 |
| 1 | 2  | 3  | 2  | 1 |
FIG.7
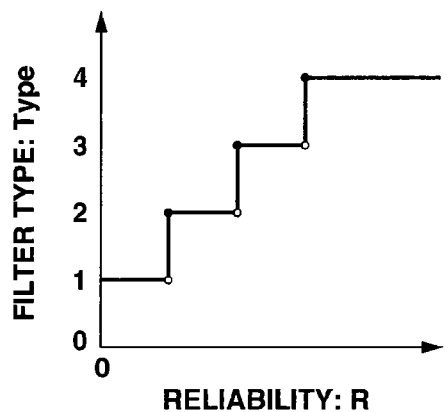
FIG.8
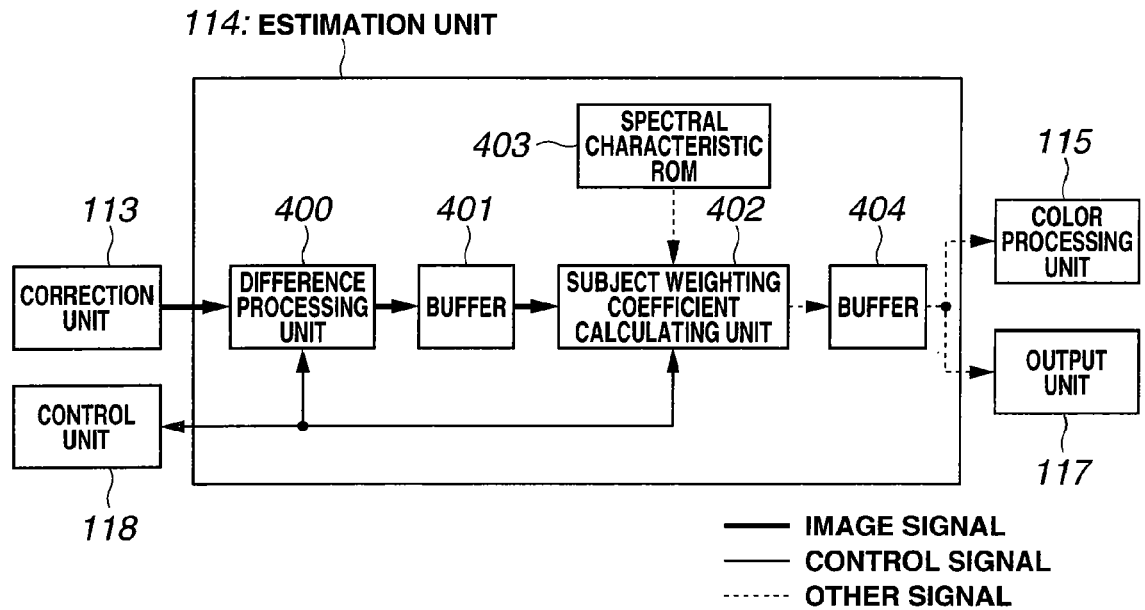

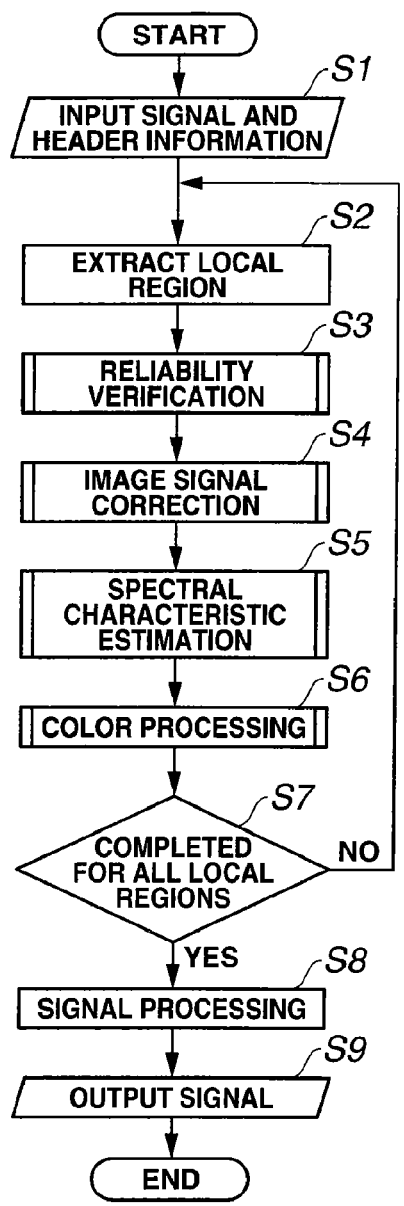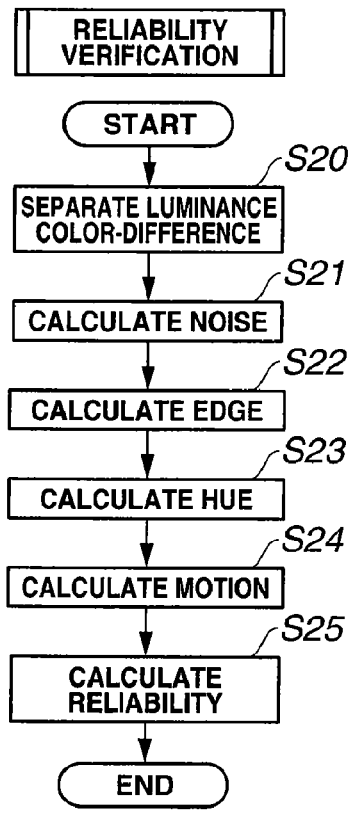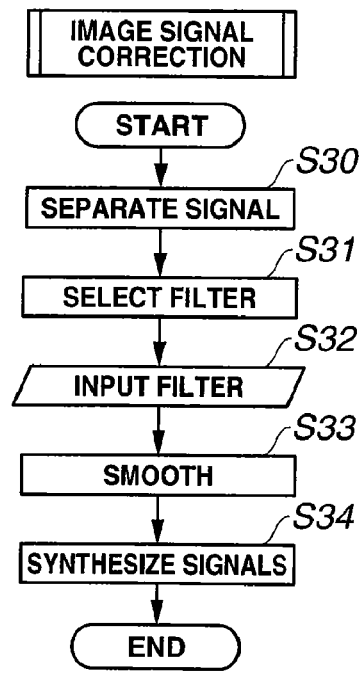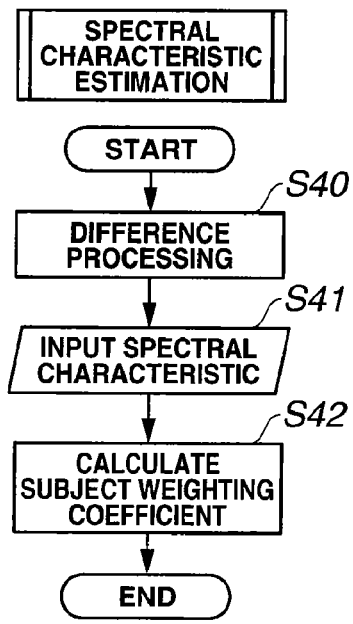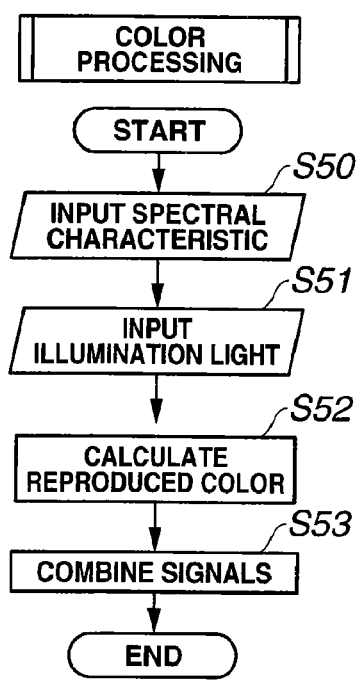

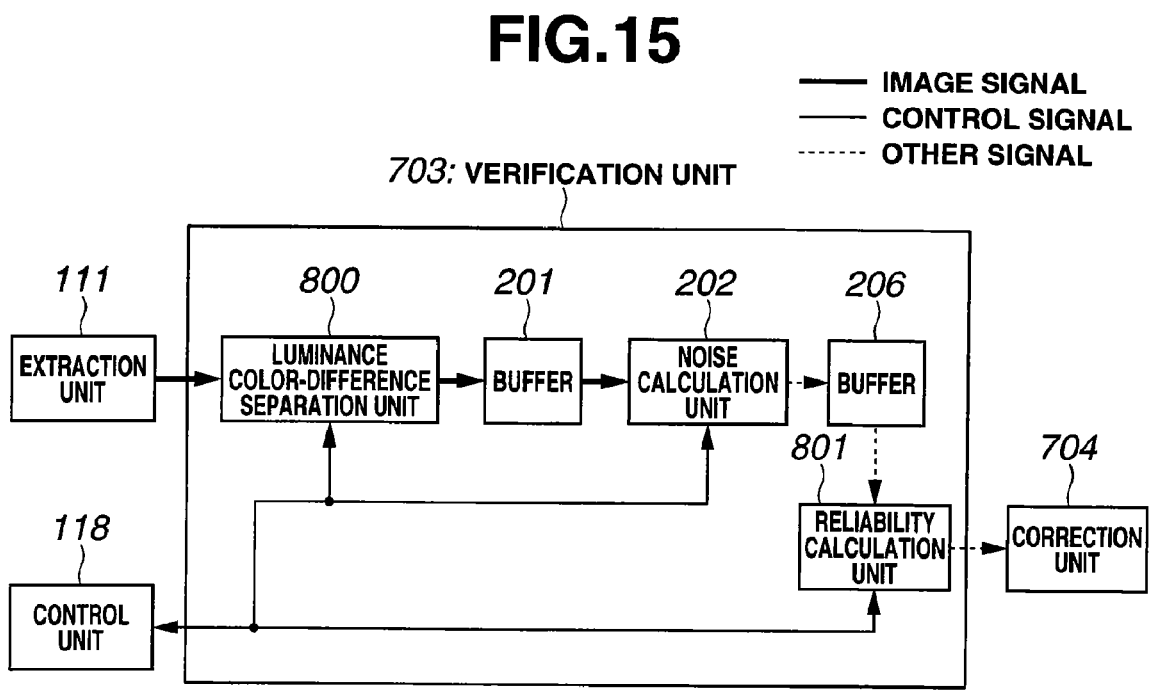

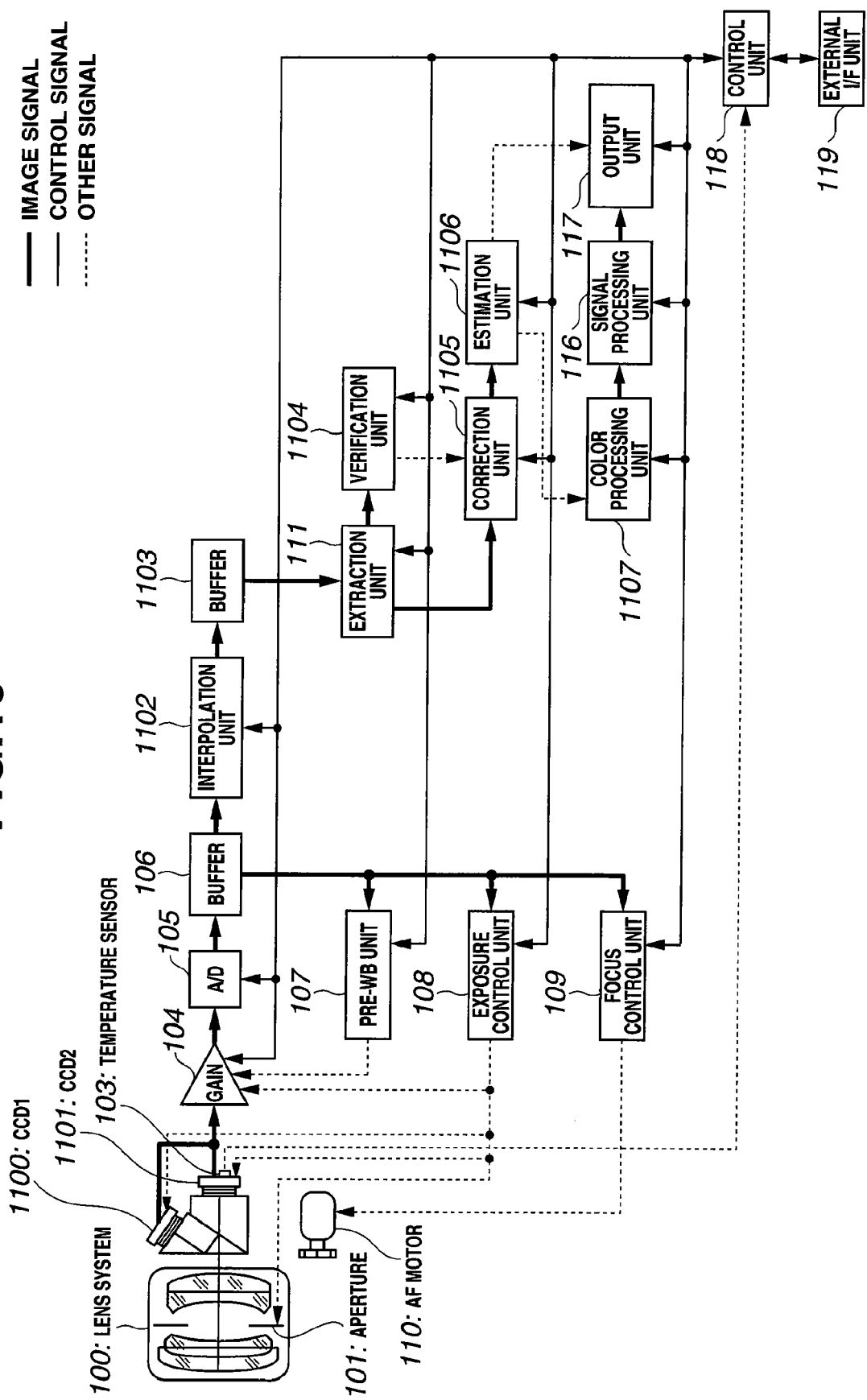

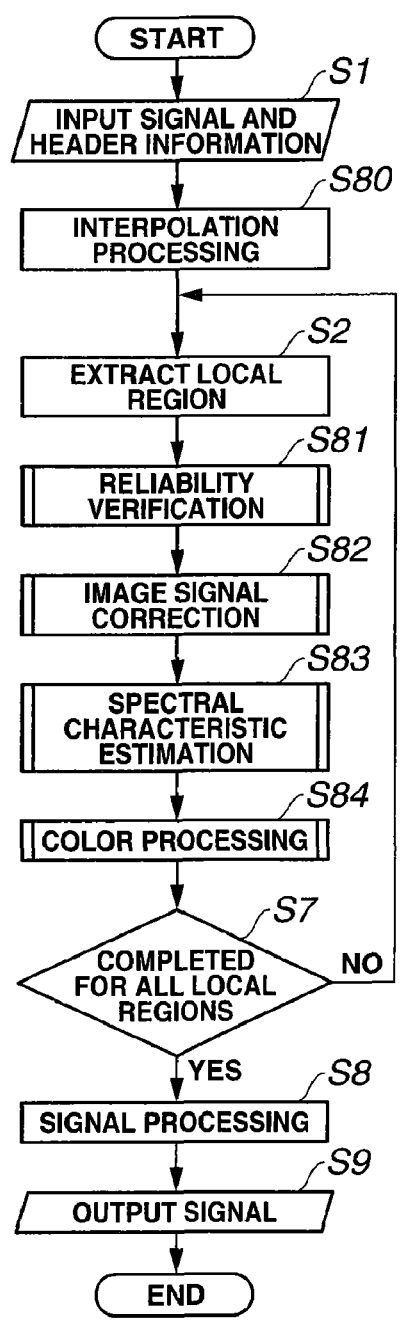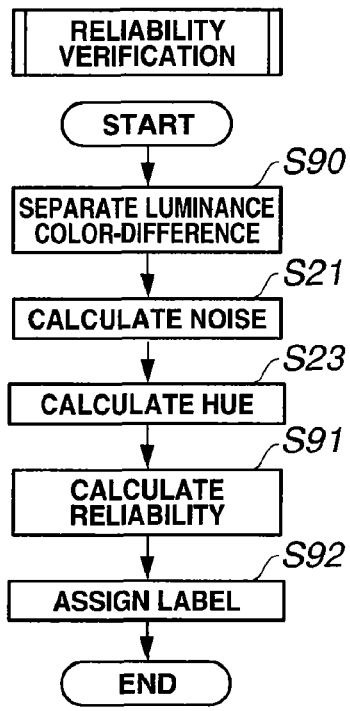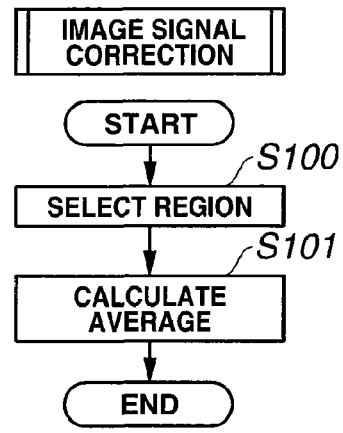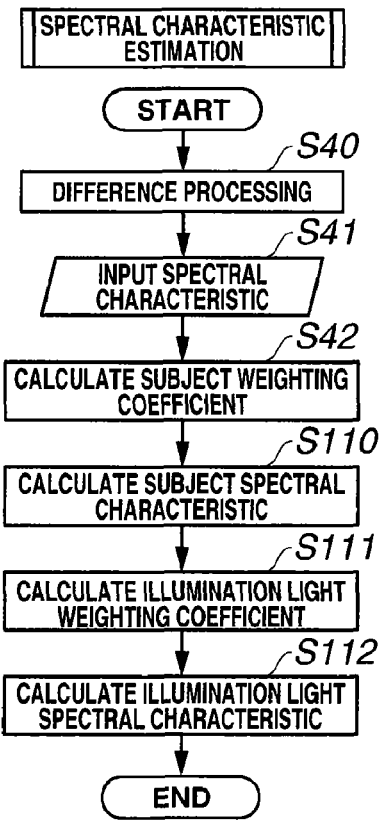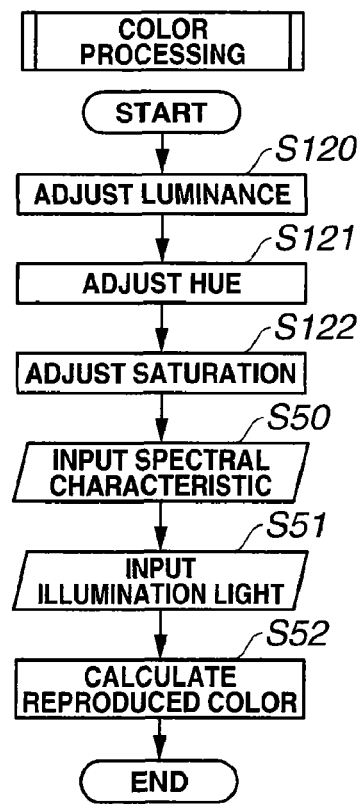

IMAGE PICKUP SYSTEM AND IMAGE PICKUP PROGRAM

CROSS REFERENCE TO RELATED APPLICATION

This application is a continuation application of PCT/JP2007/061893 filed on Jun. 13, 2007 and claims benefit of Japanese Application No. 2006-172985 filed in Japan on Jun. 22, 2006, the entire contents of which are incorporated herein by this reference.

BACKGROUND OF INVENTION

1. Field of the Invention

The present invention relates to an image pickup system for performing an estimation for a spectral characteristic related to a subject or an illumination light, in particular, an image pickup system capable of preventing generation of an estimation error due to generation of a noise included in an image signal, a false color accompanied by an interpolation processing, a motion blur of the subject, or the like, and realizing a high accuracy estimation for a spectral characteristic.

2. Description of the Related Art

As a conventional technology for performing an estimation for an unknown spectral characteristic related to a subject or an illumination light, such a method has been proposed that a plurality of image signals having different spectral characteristics for each shooting operation are obtained by utilizing presence or absence of an external illumination, insertion of a filter into a light path, image pickup devices having different spectral characteristics, and the like, and the spectral characteristic is approximately calculated from these image signals. For example, Japanese Unexamined Patent Application Publication No. 2001-78202 discloses such an example that two types of image signals having different spectral characteristics for each shooting operation are obtained by utilizing presence or absence of a flash lamp light and insertion of a fitter into a light path, modeling of the spectral characteristic that should be estimated is performed through linear combination of a small number of basis functions, and a weighting coefficient with respect to the above-mentioned basis functions is calculated from the above-mentioned two type of image signals for performing the estimation. With this configuration, without depending on the illumination light for each shooting operation, it is possible to obtain the spectral characteristic of the reflected light of the subject (hereinafter, which is simply referred to as spectral characteristic of the subject), and the image signal can be generated under an arbitrary illumination condition. Also, Japanese Unexamined Patent Application Publication No. 2004-186879 discloses such an example that two types of image signals having different spectral characteristics for each shooting operation are obtained by using two types of pixels having different spectral characteristics, and a type of a light source of an illumination light for each shooting operation is estimated. With this configuration, even for the shooting operation under a plurality of light sources, it is possible to perform a satisfactory white balance processing. Furthermore, Japanese Unexamined Patent Application Publication No. 2005-311581 discloses such an example that by shooting in advance a color code chart or the like whose spectral characteristic is known, the spectral characteristic of the subject under an arbitrary illumination condition is estimated. With this configuration, various color processing can be realized.

According to the method of estimating the unknown spectral characteristic related to the subject or the illumination light on the basis of the plurality of image signals having different spectral characteristics for each shooting operation, an inverse matrix of a system matrix related to an image sensor system or a pseudo inverse matrix based on a singular value decomposition is utilized.

SUMMARY OF THE INVENTION

An image pickup system according to the present invention includes a verification unit for verifying a reliability related to a plurality of image signals obtained by an image-pickup operation performed by setting a spectral characteristic of a color image sensor system different; a correction unit for performing a correction processing on the plurality of image signals on the basis of the reliability; and an estimation unit for performing an estimation for an unknown spectral characteristic related to a subject or an illumination light on the basis of the plurality of image signals on which the correction processing is performed.

An image pickup program according to the present invention is an image pickup program for instructing a computer to execute: a function of verifying a reliability related to a plurality of image signals obtained by an image pickup operation performed by setting a spectral characteristic of a color image sensor system different a function of performing a correction processing on the plurality of image signals on the basis of the reliability; and a function of performing an estimation for an unknown spectral characteristic related to a subject or an illumination light on the basis of the plurality of image signals on which the correction processing is performed.

According to a first aspect of the present invention, there is provided an image pickup system configured to perform an estimation for an unknown spectral characteristic related to a subject or an illumination light on the basis of an image signal from a color image sensor system, the image pickup system includes: a control unit for performing a control to change a predetermined spectral characteristic in the color image sensor system in a time series manner and cause a plurality of image pickup operations; a verification unit for verifying a reliability related to the plurality of image signals obtained from the plurality of image pickup operations; a correction unit for performing a correction processing on the plurality of image signals on the basis of the reliability; and an estimation unit for performing the estimation for an unknown spectral characteristic related to the subject or the illumination light on the basis of the plurality of image signals on which the correction processing is performed.

According to the first aspect of the present invention, the image signal is corrected on the basis of the reliability of the image signal, and then the estimation for an unknown spectral characteristic related to the subject or the illumination light is performed, so that it is possible to provide the image pickup system capable of performing the estimation for the spectral characteristic with the high accuracy. Also, as the plurality of image signals having the different spectral characteristics are obtained in the time series manner, the affinity and compatibility to the conventional image pickup system, and the decrease in the costs can be achieved.

According to a second aspect of the present invention, there is provided an image pickup system configured to perform an estimation for an unknown spectral characteristic related to a subject or an illumination light on the basis of a plurality of image signals from a plurality of color image sensor systems having different spectral characteristics, the image pickup system includes: a verification unit for verifying a reliability related to the plurality of image signals; a correction unit for performing a correction processing on the plurality of image signals on the basis of the reliability; and an estimation unit for performing the estimation for an unknown spectral characteristic related to the subject or the illumination light on the basis of the plurality of image signals on which the correction processing is performed.

According to the second aspect of the present invention, the plurality of image signals are obtained from the plurality of color image sensor systems having the different spectral characteristics in one shooting operation, the image signal is corrected on the basis of the reliability of the image signal, and then the estimation for an unknown spectral characteristic related to the subject or the illumination light is performed, so that it is possible to provide the image pickup system capable of performing the estimation for the spectral characteristic with the high accuracy. Also, as the plurality of image signals having the different spectral characteristics are obtained from the plurality of color image sensor systems having the different spectral characteristics are obtained in one shooting operation, it is possible to perform the estimation for spectral characteristics also regarding the moving body with the high accuracy.

According to a third aspect of the present invention, there is provided an image pickup program for image pickup processing to perform an estimation for an unknown spectral characteristic related to a subject or an illumination light on the basis of an image signal from a color image sensor system, the image pickup program instructing a computer to execute: a function of performing a control to change a predetermined spectral characteristic in the color image sensor system in a time series manner and cause a plurality of image pickup operations; a function of verifying a reliability related to the plurality of image signals obtained from the plurality of image pickup operations; a function of performing a correction processing on the plurality of image signals on the basis of the reliability; and a function of performing the estimation for an unknown spectral characteristic related to the subject or the illumination light on the basis of the plurality of image signals on which the correction processing is performed.

According to a fourth aspect of the present invention, there is provided an image pickup program for image pickup processing to perform an estimation for an unknown spectral characteristic related to a subject or an illumination light on the basis of a plurality of image signals from a plurality of color image sensor systems having different spectral characteristics, the image pickup program instructing a computer to execute: a function of verifying a reliability related to the plurality of image signals; a function of performing a correction processing on the plurality of image signals on the basis of the reliability; and a function of performing the estimation for an unknown spectral characteristic related to the subject or the illumination light on the basis of the plurality of image signals on which the correction processing is performed.

BRIEF DESCRIPTION OF THE DRAWINGS

FIG. 1 is a configuration diagram of an image pickup system according to a first embodiment of the present invention.

FIGS. 2A to 2D are explanatory diagrams related to a local region.

FIG. 4 is a configuration diagram of a correction unit in FIG. 1.

FIGS. 5A to 5C are explanatory diagrams related to signal separation and synthesis.

FIGS. 6A to 6D are explanatory diagrams related to a smoothing filter.

FIG. 7 is an explanatory diagram related to selection of the smoothing filter.

FIG. 8 is a configuration diagram of an estimation unit in FIG. 1.

FIGS. 12A to 12E are flowcharts of a signal processing according to the first embodiment of the present invention.

FIGS. 14A and 14B are explanatory diagrams related to a local region.

FIG. 15 is a configuration diagram of a verification unit in FIG. 13.

FIG. 19 is a configuration diagram of an image pickup system according to a third embodiment of the present invention.

FIGS. 25A to 25E are flowcharts of a signal processing according to the third embodiment of the present invention.

DETAILED DESCRIPTION OF THE PREFERRED EMBODIMENT(S)

Embodiments of the present invention will be described with reference to the drawings.

First Embodiment

Figure 3:
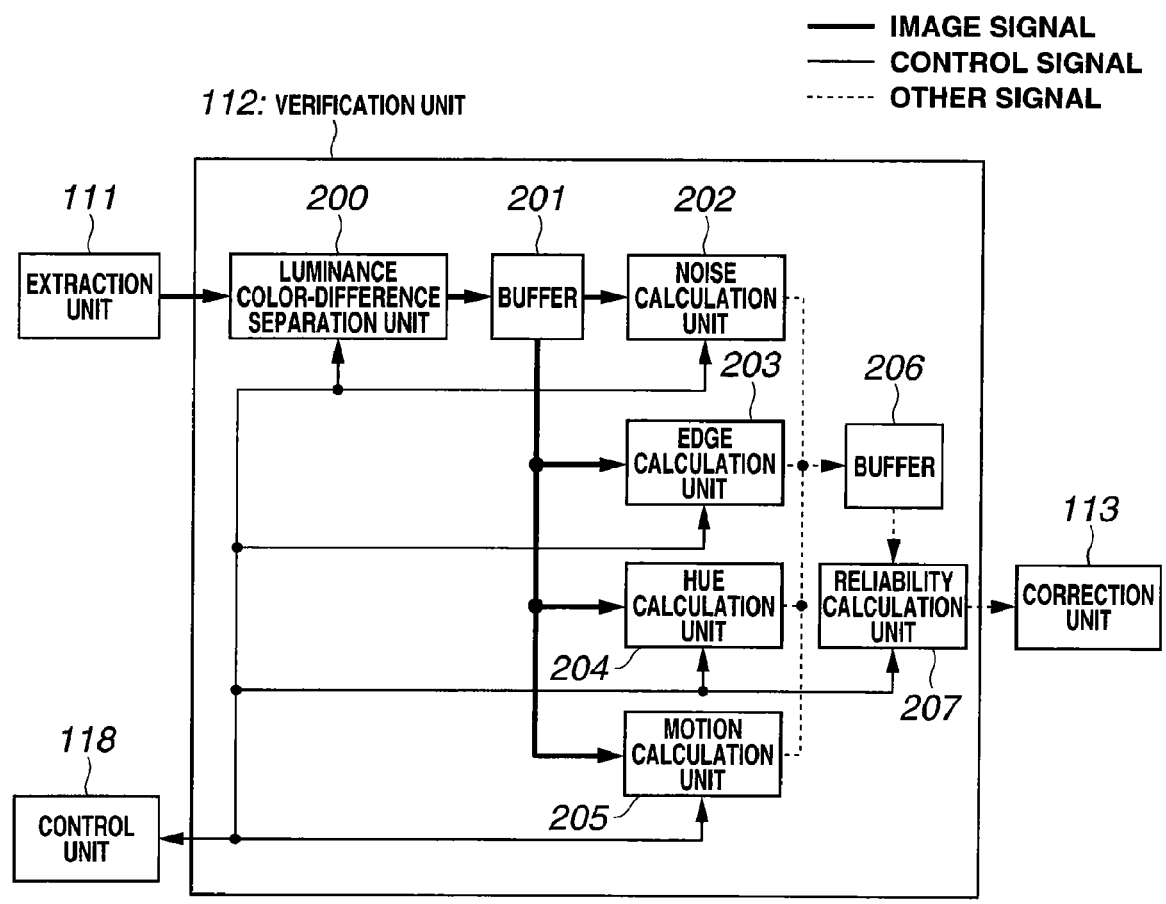
FIG. 3 is a configuration diagram of a verification unit in FIG. 1.
Figure 9:
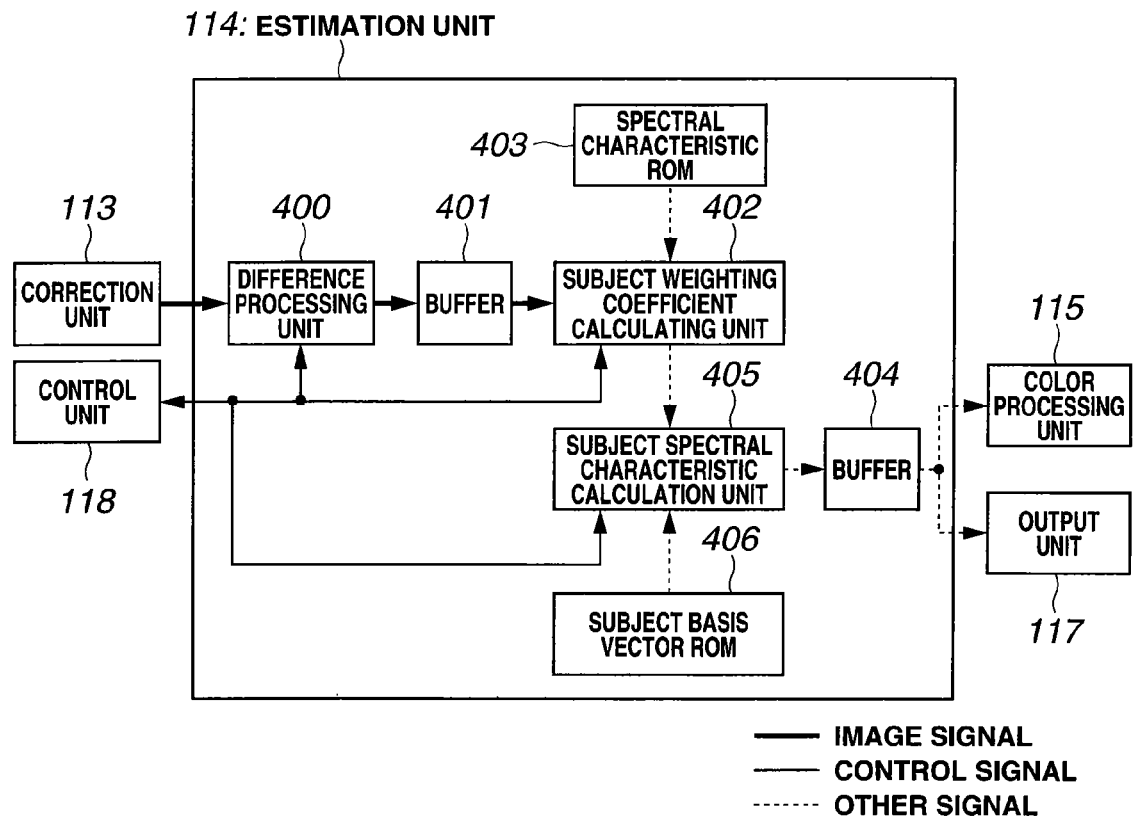
FIG. 9 is a configuration diagram of another configuration of the estimation unit in FIG. 1.
Figure 10:
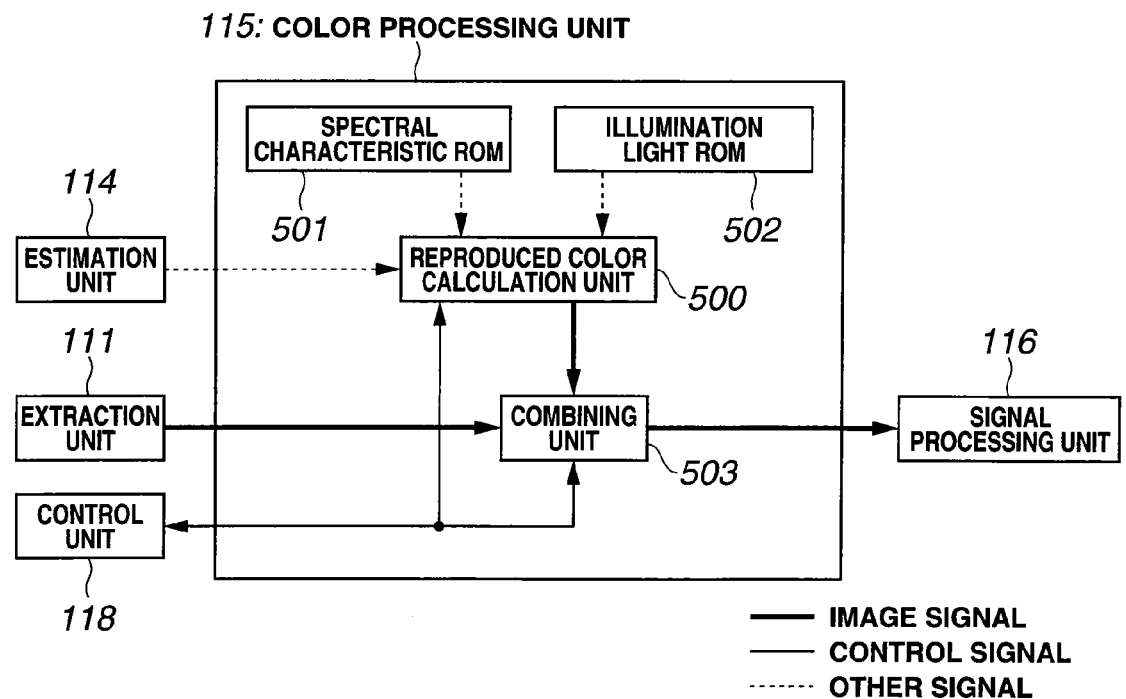
FIG. 10 is a configuration diagram of a color processing unit in FIG. 1.
Figure 11:
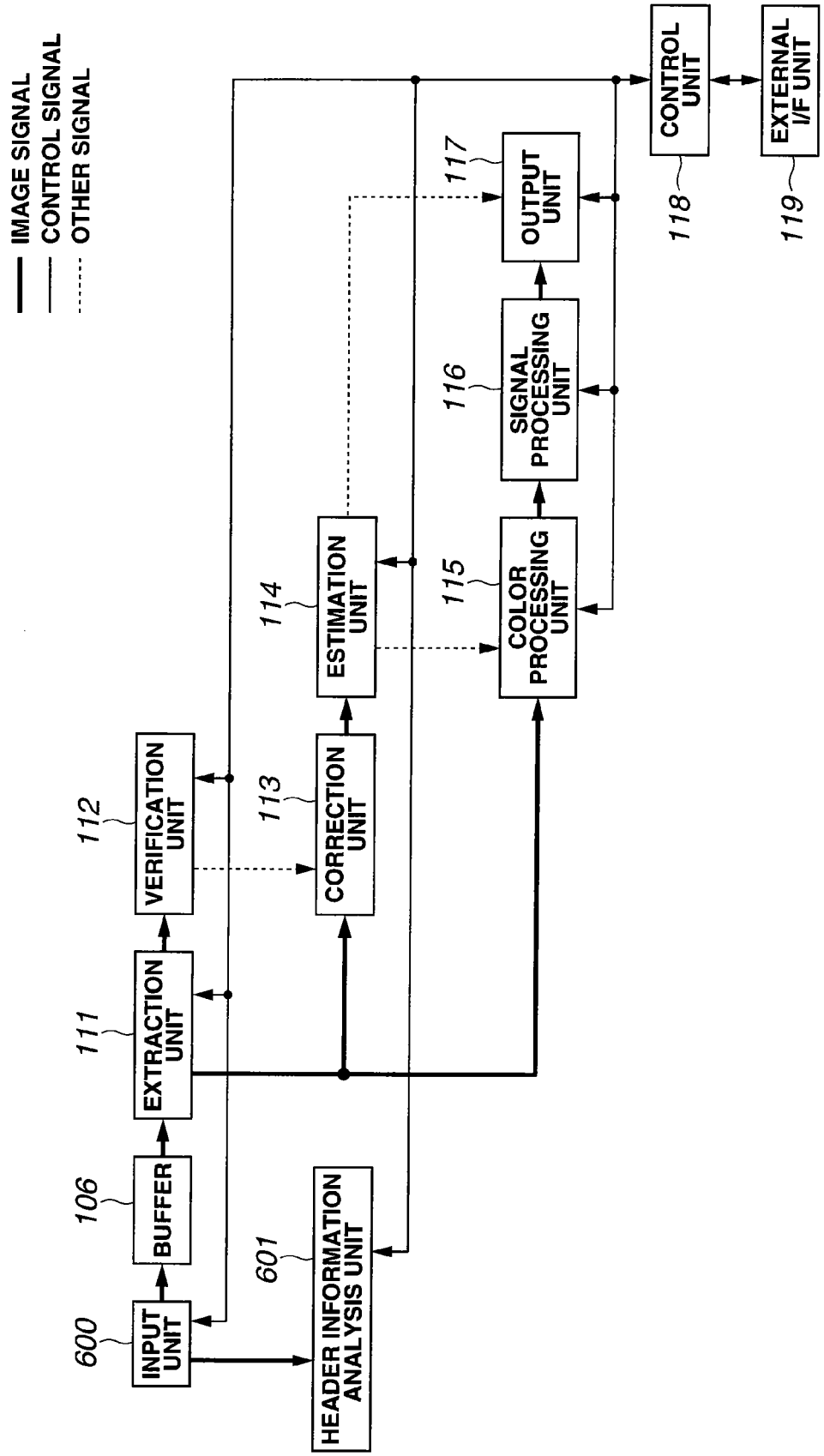
FIG. 11 is a configuration diagram of the image pickup system according to another form of the first embodiment of the present invention.

FIGS. 1 to 12E relate to a first embodiment of the present invention: FIG. 1 is a configuration diagram of an image pickup system according to a first embodiment of the present invention, FIGS. 2A to 2D are explanatory diagrams related to a local region, FIG. 3 is a configuration diagram of a verification unit, FIG. 4 is a configuration diagram of a correction unit, FIGS. 5A to 5C are explanatory diagrams related to signal separation and synthesis, FIGS. 6A to 6D are explanatory diagrams related to a smoothing filter, FIG. 7 is an explanatory diagram related to selection of the smoothing filter, FIG. 8 is a configuration diagram of an estimation unit, FIG. 9 is a configuration diagram of another configuration of the estimation unit, FIG. 10 is a configuration diagram of a color processing unit, FIG. 11 is a configuration diagram of another form of the first embodiment, and FIGS. 12A to 12E are flowcharts of a signal processing according to the first embodiment of the present invention.

[Configuration]

FIG. 1 is a configuration diagram of the embodiment of the present invention. An image signal captured via a lens system 100, an aperture 101, and a CCD 102 is amplified by a gain control amplifier (hereinafter, which is abbreviated as GAIN) 104 and converted into a digital signal by an A/D converter (hereinafter, which is abbreviated as A/D) 105. The signal from the A/D 105 is transferred via a buffer 106 to an extraction unit 111. The buffer 106 is also connected to a pre-white balance unit (hereinafter, which is abbreviated as PRE-WB unit) 107, an exposure control unit 108, and a focus control unit 109. The exposure control unit 108 is connected to the aperture 101, the CCD 102, and the GAIN 104, and the focus control unit 109 is connected to an auto focus motor (hereinafter, which is abbreviated as AF motor) 110. The extraction unit 111 is connected to a verification unit 112, a correction unit 113, and a color processing unit 115. The verification unit 112 is connected to the correction unit 113, the correction unit 113 is connected to an estimation unit 114, and the estimation unit 114 is connected to the color processing unit 115 and an output unit 117. The color processing unit 115 is connected via a signal processing unit 116 to the output unit 117. A control unit 118 such as a micro computer is bi-directionally connected to the GAIN 104, the A/D 105, the PRE-WB unit 107, the exposure control unit 108, the focus control unit 109, the extraction unit 111, the verification unit 112, the correction unit 113, the estimation unit 114, the color processing unit 115, the signal processing unit 116, and the output unit 117. Also, an external I/F unit 119 provided with a power source switch, a shutter button, an interface for performing settings such as a switching of various modes for each shooting operation is also bi-directionally connected to the control unit 118. Furthermore, a signal from a temperature sensor 103 arranged in the vicinity of the CCD 102 is connected to the control unit 118. Also, a flash lamp 120 which is arranged in the vicinity of the lens system 100 and functions as illumination means is bi-directionally connected to the control unit 118.

[Operation]

Next, an operation will be described along a flow of the signal.

After an image pickup condition such as an ISO sensitivity is set, by half pressing the shutter button via the external I/F unit 119, a pre-image pickup mode is entered. The signal captured via the lens system 100, the aperture 101, and the CCD 102 is outputted as an analog signal.

It should be noted that according to the present embodiment, for the image sensor system, such a single CCD is supposed that a Bayer type primary color filter is arranged on a front face. FIG. 2A illustrates a configuration of the Bayer-type primary color filter. Herein, a local region of 10×10 pixels of the Bayer-type primary color filter is illustrated. The Bayer-type sets 2×2 pixels as a basic unit, a red (R) filter and a blue (B) filter are arranged by one pixel each, and green (Gr and Gb) filters are arranged by two pixels. It should be noted that the green filters are identical to each other, but in the present example, the green filters are distinguished as Gr and Gb for convenience of the processing.

The signal in the buffer 106 is transferred to the PRE-WB unit 107, the exposure control unit 108, and the focus control unit 109. In the PRE-WB unit 107, the signals at a predetermined luminance level are multiplied for each color signal to calculate a simplified white balance coefficient. The above-mentioned coefficient is transferred to the GAIN 104, and a different gain is set for each color signal, so that a simplified white balance processing is performed. In the exposure control unit 108, while the set ISO sensitivity, a shutter speed of a limit of image stability, and the like are taken into account, the luminance level in the signal is calculated, and in order to obtain an appropriate exposure, the aperture 101, an electronic shutter speed of the CCD 102, a gain of the GAIN 104, and the like are controlled. Also, in the focus control unit 109, an edge strength in the signal is detected, and the AF motor 110 is controlled so that the edge strength becomes maximum to obtain a focus signal. Next, by fully pressing the shutter button via the external I/F unit 119, the real shooting for the first time is performed, and the image signal is transferred to the buffer 106 as in the pre shooting. The real shooting for the first time is performed on the basis of the simplified white balance coefficient calculated by the PRE-WB unit 107, an exposure condition calculated by the exposure control unit 108, and a focus condition calculated by the focus control unit 109, and these conditions for shooting operation are transferred to the control unit 118. Next, the control unit 118 determines a light emitting amount of the flash lamp 120 on the basis of the above-mentioned exposure condition and focus condition, and the real shooting for the second time is performed in which the flash lamp 120 is caused to emit light. The control unit 118 and the flash lamp 120 constitute control means for performing such a control that a predetermined spectral characteristic in a color image sensor system is changed in a time series manner, and a plurality of shooting operations are performed. The above-mentioned image signal of the real shooting for the second time is transferred to the buffer 106 similarly to the image signal of the real shooting for the first time. In the buffer 106, the image signals of the real shooting for the first time and for the second time are saved. The image signals in the buffer 106 are transferred to the extraction unit 111.

The extraction unit 111 sequentially extracts a 10×10 pixel size local region having a 2×2 pixel target region as a center illustrated in FIG. 2A on the basis of the control of the control unit 118. The 10×10 pixel size local region is composed of 81 regions having the size of 2×2 pixels, and is composed of one target region having the size of 2×2 pixels and 80 neighborhood regions having the size of 2×2 pixels. The above-mentioned local region is extracted from the same position from the image signal of the real shooting for the first time and the image signal of the real shooting for the second time, and therefore two local regions exist. Also, as the target region is set to have 2×2 pixels, the local regions are extracted while overlapped eight pixels each in the horizontal and vertical directions.

The verification unit 112 reads the above-mentioned two local regions from the extraction unit 111, verifies the reliability in the spectral characteristic estimation, and transfers the result on the reliability to the correction unit 113 on the basis of the control of the control unit 118. The correction unit 113 reads the above-mentioned two local regions from the extraction unit 111, reads the result on the reliability from the verification unit 112, and performs the correction processing on the above-mentioned two target regions on the basis of the control of the control unit 118. The corrected two target regions are transferred to the estimation unit 114.

The estimation unit 114 reads the corrected two target regions from the correction unit 113 and estimates the spectral characteristic related to the subject or the illumination light on the basis of the control of the control unit 118. The estimated spectral characteristic is transferred to the color processing unit 115. It should be noted that as occasion demands, the estimated spectral characteristic may be transferred to the output unit 117 and can also be separately saved.

The color processing unit 115 reads the spectral characteristic estimated from the estimation unit 114, reads the target regions related to the real shooting operation for the first time from the extraction unit 111, and performs a predetermined color processing on the basis of the control of the control unit 118. According to the present embodiment, a white balance processing based on a conversion processing to a daylight light source is presumed. The target regions on which the color processing is performed are sequentially transferred to the signal processing unit 116. The above-mentioned processings of the extraction unit 111, the verification unit 112, the correction unit 113, the estimation unit 114, and the color processing unit 115 are performed for each local region unit in synchronization with each other on the basis of the control of the control unit 118. In the signal processing unit 116, a known edge emphasis processing, a known compression processing, or the like is performed to be transferred to the output unit 117. The output unit 117 records and saves the image signal on a recording medium such as a memory card.

FIG. 3 illustrates a configuration example of the verification unit 112, which is composed of a luminance color-difference separation unit 200, a buffer 201, a noise calculation unit 202 constituting noise amount calculation means, an edge calculation unit 203 constituting edge amount calculation means, a hue calculation unit 204 constituting hue information calculation means, a motion calculation unit 205 constituting motion amount calculation means, a buffer 206, and a reliability calculation unit 207. The extraction unit 111 is connected via the luminance color-difference separation unit 200 to the buffer 201. The buffer 201 is connected to the noise calculation unit 202, the edge calculation unit 203, the hue calculation unit 204, and the motion calculation unit 205. The noise calculation unit 202, the edge calculation unit 203, the hue calculation unit 204, the motion calculation unit 205 are connected to the buffer 206. The buffer 206 is connected via the reliability calculation unit 207 to the correction unit 113. The control unit 118 is bi-directionally connected to the luminance color-difference separation unit 200, the noise calculation unit 202, the edge calculation unit 203, the hue calculation unit 204, and the motion calculation unit 205, and the reliability calculation unit 207. The luminance color-difference separation unit 200 reads two local regions from the extraction unit 111 to separate into a luminance signal and a color-difference signal on the basis of the control of the control unit 118. The separation into the luminance signal and the color-difference signal is performed for the unit of the target region of the 2×2 pixels and the neighborhood region of the 2×2 pixels.

FIG. 2A illustrates a configuration of the target region and the neighborhood region in the local region according to the present embodiment. In the 10×10 pixel size local region according to the present embodiment, one target region of the 2×2 pixels ($R_{44}$, $Gr_{54}$, $Gb_{45}$, $B_{55}$) is presumed, and the 2×2 pixels includes one target region, and also total 80 neighborhood regions arranged so as to be overlapped one row, one column each are presumed. A luminance signal Y and color-difference signals Cb and Cr in the target region are calculated through Expression (1).

$$Y=(Gr_{54}+Gb_{45})/2$$

$$Cb=B_{55}-(Gr_{54}+Gb_{45})/2$$

$$Cr=R_{44}-(Gr_{54}+Gb_{45})/2 \quad (1)$$

Also in the neighborhood regions, the calculation is similarly performed. FIG. 2B illustrates the separation into the luminance/color-difference signals from the local region of FIG. 2A. As illustrated in FIG. 2B, from one local region, 81 luminance signals Y and color-difference signals Cb and Cr are calculated. The luminance signals and the color-difference signals calculated from the two local regions are transferred to the buffer 201.

The noise calculation unit 202 reads the luminance signals from the buffer 201, reads the ISO sensitivity, the simplified white balance coefficient, and the exposure condition for each shooting operation from the control unit 118, reads the temperature information from the temperature sensor 103, and calculates the noise amount in the target region on the basis of the control of the control unit 118. The calculation for the noise amount is realized by a method disclosed, for example, in Japanese Unexamined Patent Application Publication No. 2006-23959. The above-mentioned noise amounts are independently calculated for each of the two local regions. The noise calculation unit 202 selects a larger noise amount of the calculated two noise amounts to be transferred to the buffer 206.

The edge calculation unit 203 reads the luminance signals from the buffer 201 and calculates the edge amount in the target region on the basis of the control of the control unit 118. The edge amount is calculated, for example, by performing a known Laplacian processing or the like, which is a second order differentiation filtering, on a 3×3 region with the target region set as the center, for example. The above-mentioned edge amount is independently calculated for each of the two local regions. The edge calculation unit 203 selects a larger one of the calculated two edge amounts to be transferred to the buffer 206.

The hue calculation unit 204 reads the color-difference signals from the buffer 201 and calculates a standard deviation of the hue signals in the local region on the basis of the control of the control unit 118. A hue signal H is calculated on the basis of Expression (2).

$$H=\tan^{-1}(Cb/Cr) \quad (2)$$

The 81 hue signals are calculated in one local region, and from those, the standard deviation of the hue signals is calculated. The standard deviations of the hue signals are independently calculated for each of two local regions. The hue calculation unit 204 selects a larger standard deviation of the calculated two standard deviations to be transferred to the buffer 206.

The motion calculation unit 205 reads the luminance signals from the buffer 201 and calculates the motion amount in the target region on the basis of the control of the control unit 118. The motion amount is calculated by extracting a 3×3 region with the target region as the center from the local region obtained from the real shooting operation for the first time and performing a known block matching processing in the local region obtained from the real shooting operation for the second time. The motion calculation unit 205 transfers the calculated motion amount to the buffer 206. After the above-mentioned processing is completed, in the buffer 206, a noise amount N, an edge amount E, a standard deviation of the hue signals $H_D$, and a motion amount M exist. It should be noted that the calculation method for the noise, the edge, the standard deviation of the hue signals, and the motion amount are not limited to the above-mentioned method.

The reliability calculation unit 207 reads the noise amount N, the edge amount E, the standard deviation of the hue signals $H_D$, and the motion amount M in the buffer 206 on the basis of the control of the control unit 118. After that, a reliability R with respect to the target region is calculated on the basis of Expression (3).

$$R=k_1 \cdot N+k_2 E+k_3 \cdot H_D+k_4 \cdot M \quad (3)$$

In Expression (3), $k_1$, $k_2$, $k_3$, and $k_4$ are predetermined positive constant terms. The reliability R is a positive number equal to or larger than 0 and takes a larger value as the noise amount N, the edge amount E, the standard deviation of the hue signals $H_D$, and the motion amount M are larger. As the noise amount N, the edge amount E, the standard deviation of the hue signals $H_D$, and the motion amount M are larger, the accuracy in the estimation for the spectral characteristic is decreased, so that the above-mentioned reliability R represents a reliability in the estimation for the spectral characteristic. That is, the calculation for the reliability R in Expression (3) is equivalent to the verification for the reliability related to the image signal. The calculated reliability R is transferred to the correction unit 113. It should be noted that in the above-mentioned example, the reliability R is calculated from the four items including the noise amount N, the edge amount E, the standard deviation of the hue signals $H_D$, and the motion amount M, but the configuration is not necessarily limited to the above-mentioned configuration. Although the accuracy is decreased, such a configuration can be adopted that the processing speed is increased by reducing the number of items, and also such a configuration can be adopted that another item is added to improve the accuracy.

FIG. 4 illustrates a configuration example of the correction unit 113, which is composed of a filter selection unit 300, a filter ROM 301 constituting filter recording means, a signal separation unit 302, a buffer 303, a smoothing unit 304 constituting smoothing processing means, a buffer 305, and a signal synthesis unit 306. The extraction unit 111 is connected via the signal separation unit 302, the buffer 303, the smoothing unit 304, the buffer 305, and the signal synthesis unit 306 to the estimation unit 114. The detection unit 112 and the filter ROM 301 are connected to the filter selection unit 300, and the filter selection unit 300 is connected to the smoothing unit 304. The control unit 118 is bi-directionally connected to the filter selection unit 300, the signal separation unit 302, the smoothing unit 304, and the signal synthesis unit 306. The signal separation unit 302 reads two local regions from the extraction unit 111 and separates the signal for each color signal of the image sensor system on the basis of the control of the control unit 118. According to the present embodiment, as the image sensor system, a single CCD in which the Bayer-type primary color filter is arranged on a front face is presumed, and as the local region, a 10×10 pixel size is presumed.

FIG. 5A illustrates the above-mentioned 10×10 local region, and FIG. 5B illustrates a state in which from the local region of FIG. 5A, the separation into four types of color signals including R, Gr, Gb, and B is performed. The color signals separated from the two local regions are transferred to the buffer 303. The filter selection unit 300 reads the reliability R from the verification unit 112, and selects and reads a filter coefficient used for a smoothing processing on the basis of the reliability R from the filter ROM 301 on the basis of the control of the control unit 118.

FIGS. 6A to 6D illustrate examples of a 5×5 filter coefficient recorded in the filter ROM 301.

FIGS. 6A to 6D respectively illustrate four types of filter coefficients including Type 1 to Type 4, and the respective coefficients are multiplied by 128. In Type 1 of FIG. 6A, the high frequency components are remained, and such a frequency characteristic is set so that the high frequency components are gradually suppressed up to Type 4 of FIG. 6D. The filter selection unit 300 selects Type of the filter type, for example, on the basis of the relation between the reliability R and the Types of the filter Types shown in FIG. 7. The reliability R takes a larger value as the degree of affecting the estimation for the spectral characteristic is larger. In other words, the value of the reliability R takes a smaller value as the reliability in general term is higher and takes a larger value as the reliability is lower. Also, as the type of the filter, the frequency characteristic which more suppresses the high frequency components is selected as the reliability R is larger. That is, as the degree of affecting the estimation for the spectral characteristic is larger, the high frequency components are more suppressed. The selected filter coefficient is transferred to the smoothing unit 304. The smoothing unit 304 sequentially reads the color signals separated from the buffer 303, according to the present embodiment, the four types of color signals R, Gr, Gb, and B, on the basis of the control of the control unit 118. It should be noted that as the color signals are obtained from the two local regions, the eight color signals are read in total. The read color signal is subjected to the smoothing processing based on the filter coefficient from the filter selection unit 300, and a smoothing signal with respect to the target region is obtained. The signal after the smoothing is transferred to the buffer 305. In the buffer 305, the smoothed signals exist in the two target regions in the two local regions. The signal synthesis unit 306 reads the signal with respect to the target region on which the smoothing processing is performed on the basis of the control of the control unit 118. This is synthesized in the arrangement of the image sensor system, according to the present embodiment, the Bayer-type primary color filter. FIG. 5C illustrates the 2×2 pixel target region synthesized from the region for each color of R, Gr, Gb, and B of the FIG. 5B. The synthesis processing is independently performed for the two local regions, and the two target regions are synthesized. The synthesized two target regions are transferred to the estimation unit 114.

FIG. 8 illustrates a configuration example of the estimation unit 114, which is composed of a difference processing unit 400, a buffer 401, a subject weighting coefficient calculating unit 402, a spectral characteristic ROM 403 constituting spectral characteristic recording means, and a buffer 404. The correction unit 113 is connected via the difference processing unit 400, the buffer 401, the subject weighting coefficient calculating unit 402, and the buffer 404 to the color processing unit 115 and the output unit 117. The spectral characteristic ROM 403 is connected to the subject weighting coefficient calculating unit 402. The control unit 118 is bi-directionally connected to the difference processing unit 400 and the subject weighting coefficient calculating unit 402. The difference processing unit 400 reads the two target regions on which the correction processing is performed from the correction unit 113 on the basis of the control of the control unit 118. After that, RGB three signals in the target region captured with the illumination light under an external environment for the shooting operation for the first time are denoted by $CL_R$, $CL_G$, and $CL_B$. It should be noted that $CL_G$ is an average of Gr and Gb. Also, RGB three signals in the target region captured with mixture of the illumination light under an external environment and the flash lamp light for the shooting operation for the second time are denoted by $CLS_R$, $CLS_G$, and $CLS_B$. The difference processing unit 400 performs the difference processing on the target region of the shooting operation for the first time from the target region of the shooting operation for the second time to obtain RGB three signals $CS_R$, $CS_G$, and $CS_B$ which are equivalent to the case captured by using only the flash lamp light.

$$CS_R = CLS_R - CL_R$$

$$CS_G = CLS_G - CL_G$$

$$CS_B = CLS_B - CL_B \quad (4)$$

The RGB three signals $CS_R$, $CS_G$, and $CS_B$ using only the calculated flash lamp light are transferred to the buffer 401. The spectral characteristic ROM 403 records the information related to the spectral characteristic of the image sensor system. In order to estimate the spectral characteristic of the subject, the spectral sensitivity characteristics of the image sensor system $S_R(\lambda)$, $S_G(\lambda)$, and $S_B(\lambda)$, the image sensor system using, according to the present embodiment, the Bayer-type primary color filter, a spectral emissivity characteristic of the flash lamp light $IS(\lambda)$, and three types of basis functions $O_1(\lambda)$, $O_2(\lambda)$, and $O_3(\lambda)$ for approximating a spectral reflectance characteristic of the subject $O(\lambda)$ are necessary. Herein, $\lambda$=the visible range between 380 to 780 nm is meant. The spectral reflectance characteristic of the subject $O(\lambda)$ can be approximated by using weighting coefficients $o_1$, $o_2$, and $o_3$ with respect to the three types of basis functions $O_1(\lambda)$, $O_2(\lambda)$, and $O_3(\lambda)$ as shown in Expression (5).

$$O(\lambda) = o_1 \cdot O_1(\lambda) + o_2 \cdot O_2(\lambda) + o_3 \cdot O_3(\lambda) \qquad (5)$$

The above-mentioned weighting coefficients $o_1$, $o_2$, and $o_3$ are calculated by Expression (6).

$$\begin{pmatrix} o_1 \\ o_2 \\ o_3 \end{pmatrix} = \begin{pmatrix} \int IS(\lambda) \cdot O_1(\lambda) \cdot S_R(\lambda) d\lambda & \int IS(\lambda) \cdot O_1(\lambda) \cdot S_G(\lambda) d\lambda & \int IS(\lambda) \cdot O_1(\lambda) \cdot S_B(\lambda) d\lambda \\ \int IS(\lambda) \cdot O_2(\lambda) \cdot S_R(\lambda) d\lambda & \int IS(\lambda) \cdot O_2(\lambda) \cdot S_G(\lambda) d\lambda & \int IS(\lambda) \cdot O_2(\lambda) \cdot S_B(\lambda) d\lambda \\ \int IS(\lambda) \cdot O_3(\lambda) \cdot S_R(\lambda) d\lambda & \int IS(\lambda) \cdot O_3(\lambda) \cdot S_G(\lambda) d\lambda & \int IS(\lambda) \cdot O_3(\lambda) \cdot S_B(\lambda) d\lambda \end{pmatrix}^{-1} \begin{pmatrix} CS_R \\ CS_G \\ CS_B \end{pmatrix} \qquad (6)$$

$$= Sys^{-1} \begin{pmatrix} CS_R \\ CS_G \\ CS_B \end{pmatrix}$$

The spectral characteristic ROM 403 records the inverse matrix of the system matrix in the image sensor system $Sys^{-1}$ shown in Expression (6). The subject weighting coefficient calculating unit 402 reads the RGB three signals $CS_R$, $CS_G$, and $CS_B$ using only the flash lamp light from the buffer 401, reads the inverse matrix of the system matrix $Sys^{-1}$ from the spectral characteristic ROM 403, and calculates the weighting coefficients $o_1$, $o_2$, and $o_3$ on the basis of Expression (6) with respect to the basis functions $O_1(\lambda)$, $O_2(\lambda)$, and $O_3(\lambda)$ on the basis of the control of the control unit 118. The calculated three types of the weighting coefficients are transferred to the color processing unit 115. Also, as occasion demands, the weighting coefficients can also be transferred to the output unit 117. It should be noted that the above-mentioned configuration of the estimation unit 114, as the spectral characteristic of the subject, only the weighting coefficients with respect to the basis functions for approximating the spectral reflectance characteristic of the subject are calculated, but the configuration is not limited to the above. For example, as shown in Expression (5), such a configuration of calculating the actual spectral reflectance characteristic $O(\lambda)$ can also be adopted.

FIG. 9 illustrates an example of another configuration of the estimation unit 114, where in the estimation unit 114 shown in FIG. 8, a subject spectral characteristic calculation unit 405 and a subject basis vector ROM 406 constituting subject basis vector recording means are added. The basis configuration is equivalent to that of FIG. 8, and the same configuration part will be allocated with the same name and reference numeral. Hereinafter, only a different part will be described.

In FIG. 9, the subject weighting coefficient calculating unit 402 and the subject basis vector ROM 406 are connected to the subject spectral characteristic calculation unit 405. The subject spectral characteristic calculation unit 405 is connected to the buffer 404. The control unit 118 is bi-directionally connected to the subject spectral characteristic calculation unit 405. Similarly to the estimation unit 114 shown in FIG. 8, the subject weighting coefficient calculating unit 402 calculates the weighting coefficients $o_1$, $o_2$, and $o_3$ with respect to the basis functions $O_1(\lambda)$, $O_2(\lambda)$, and $O_3(\lambda)$. The calculated three types of weighting coefficients are transferred to the subject spectral characteristic calculation unit 405. The subject basis vector ROM 406 records the three types of basis functions $O_1(\lambda)$, $O_2(\lambda)$, and $O_3(\lambda)$ for approximating the spectral reflectance characteristic of the subject $O(\lambda)$, and transfers the above-mentioned basis functions to the subject spectral characteristic calculation unit 405. On the basis of the control of the control unit 118, the subject spectral characteristic calculation unit 405 reads the weighting coefficients $o_1$, $o_2$, $o_3$ from the subject weighting coefficient calculating unit 402, reads the basis functions $O_1(l)$, $O_2(\lambda)$, and $O_3(\lambda)$ from the subject basis vector ROM 406, and calculates, on the basis of Expression (5), the spectral reflectance characteristic of the subject $O(\lambda)$. The calculated spectral reflectance characteristic of the subject $O(\lambda)$ is transferred to the buffer 404. With the above-mentioned configuration, it is possible to calculate the spectral reflectance characteristic of the subject.

FIG. 10 illustrates a configuration example of the color processing unit 115, which is composed of a reproduced color calculation unit 500, a spectral characteristic ROM 501 constituting spectral characteristic recording means, an illumination light ROM 502 constituting illumination light recording means, and a combining unit 503. The estimation unit 114, the spectral characteristic ROM 501, and the illumination light ROM 502 are connected to the reproduced color calculation unit 500. The reproduced color calculation unit 500 and the extraction unit 111 are connected to the combining unit 503. The combining unit 503 is connected to the signal processing unit 116. The control unit 118 is bi-directionally connected to the reproduced color calculation unit 500 and the combining unit 503. In order to obtain reproduced colors under an arbitrary light source on the basis of the spectral characteristic of the subject, the spectral sensitivity characteristics of the image sensor system $S_R(\lambda)$, $S_G(\lambda)$, and $S_B(\lambda)$, the image sensor system using, according to the present embodiment, the Bayer-type primary color filter the spectral emissivity characteristic of an arbitrary light source $IA(\lambda)$, and the three types of basis functions $O_1(\lambda)$, $O_2(\lambda)$, and $O_3(\lambda)$ and the weighting coefficients $o_1$, $o_2$, and $o_3$ for approximating the spectral reflectance characteristic of the subject $O$ (λ) are necessary. The reproduced colors under an arbitrary light source $CA_R$, $CA_G$, and $CA_B$ are obtained through Expression (7).

$$CA_R = \int IA(\lambda) \cdot \sum_{i=1,3} o_i O_i(\lambda) \cdot S_R(\lambda) d\lambda \qquad (7)$$

$$CA_G = \int IA(\lambda) \cdot \sum_{i=1,3} o_i O_i(\lambda) \cdot S_G(\lambda) d\lambda$$

$$CA_B = \int IA(\lambda) \cdot \sum_{i=1,3} o_i O_i(\lambda) \cdot S_B(\lambda) d\lambda$$

The spectral characteristic ROM 501 records the spectral sensitivity characteristic of the image sensor system $S_R$ (λ), $S_G$ (λ), and $S_B$ (λ) and the three types of basis functions $O_1$ (λ), $O_2$ (λ), and $O_3$ (λ) for approximating the spectral reflectance characteristic of the subject O (λ), and the illumination light ROM 502 records the spectral emissivity characteristic of the light source IA (λ). It should be noted that according to the present embodiment, as the spectral emissivity characteristic of the light source IA (λ), for example, daylight such as D65 standard light source of CIE is presumed. In this manner, without depending on the illumination light for each shooting operation, the calculation of the reproduced colors under the daylight light source is equivalent to the performance of the white balance processing. On the basis of the control of the control unit 118, the reproduced color calculation unit 500 reads the weighting coefficients $o_1$, $o_2$, and $o_3$ from the estimation unit 114, reads the spectral sensitivity characteristics $S_R$ (λ), $S_G$ (λ), and $S_B$ (λ) and the basis functions $O_1$ (λ), $O_2$ (λ), and $O_3$ (λ) from the spectral characteristic ROM 501, reads the spectral emissivity characteristic of the light source IA (λ) from the illumination light ROM 502, and calculates the reproduced colors $CA_R$, $CA_G$, and $CA_B$ on the basis of Expression (7). The calculated three types of reproduced colors are transferred to the combining unit 503. On the basis of the control of the control unit 118, the combining unit 503 reads the target regions $R_{44}$, $Gr_{54}$, $Gb_{45}$, and $B_{55}$ related to the real shooting operation for the first time shown in FIG. 2A from the extraction unit 111, reads the reproduced colors $CA_R$, $CA_G$, and $CA_B$ from the reproduced color calculation unit 500, and combines both the signals at a predetermined combining ratio k (k=0 to 1).

$CA_R'=k \cdot R_{44}+(1-k) \cdot CA_R$ $CA_G'=k \cdot (Gr_{54}+Gb_{45})/2+(1-k) \cdot CA_G$ $CA_B'=k \cdot B_{55}+(1-k) \cdot CA_B \qquad (8)$ This is because, for example, under a situation of a sunset or the like, instead of performing the complete white balance processing, the influence of the light source in the real shooting operation is set remained, so that a subjectively preferable image may be obtained. Such a configuration can be adopted that the combining ratio k is automatically set on the basis of the simplified white balance coefficient from the PRE-WB unit 107 or is mutually set via the external I/F unit 119, or the like. The reproduced colors $CA_R'$, $CA_G'$, and $CA_B'$ on which the combining processing is performed are transferred to the signal processing unit 116.

It should be noted that in the above-mentioned configuration of the color processing unit 115, to obtain the reproduced colors, the integration operation shown in Expression (7) is performed each time, but the configuration is not necessarily limited to the above. For example, by transforming Expression (7), the calculation can be performed on the basis of a system matrix Sys of the image pickup system.

$$\begin{pmatrix} CA_R \\ CA_G \\ CA_B \end{pmatrix} = \begin{pmatrix} \int IA(\lambda) \cdot O_1(\lambda) \cdot S_R(\lambda) d\lambda & \int IA(\lambda) \cdot O_2(\lambda) \cdot S_R(\lambda) d\lambda & \int IA(\lambda) \cdot O_3(\lambda) \cdot S_R(\lambda) d\lambda \\ \int IA(\lambda) \cdot O_1(\lambda) \cdot S_G(\lambda) d\lambda & \int IA(\lambda) \cdot O_2(\lambda) \cdot S_G(\lambda) d\lambda & \int IA(\lambda) \cdot O_3(\lambda) \cdot S_G(\lambda) d\lambda \\ \int IA(\lambda) \cdot O_1(\lambda) \cdot S_B(\lambda) d\lambda & \int IA(\lambda) \cdot O_2(\lambda) \cdot S_B(\lambda) d\lambda & \int IA(\lambda) \cdot O_3(\lambda) \cdot S_B(\lambda) d\lambda \end{pmatrix} \begin{pmatrix} o_1 \\ o_2 \\ o_3 \end{pmatrix} \qquad (9)$$

$$= Sys \begin{pmatrix} o_1 \\ o_2 \\ o_3 \end{pmatrix}$$

In this case, the spectral characteristic ROM 501 and the illumination light ROM 502 are integrated into one, and such a configuration can be adopted that the system matrix Sys of the image sensor system shown in Expression (9) is recorded.

With the above-mentioned configuration, the reliability is calculated from the factors affecting the estimation accuracy such as the noise included in the image signal, the false color with the interpolation processing, and the motion blur of the subject, and after the image signal is corrected by using the smoothing filter selected on the basis of the reliability, the estimation for the spectral characteristic is performed. For this reason, it can be guaranteed that the estimation accuracy for the spectral characteristic is set within an appropriate range. Also, the flash lamp is used for obtaining the plurality of image signals having the different spectral characteristics in the time series manner, and therefore the affinity and compatibility to the conventional image pickup system are high, and the decrease in the costs can be achieved. Also, as modeling of the spectral characteristic that should be estimated is performed through linear combination of a small number of basis functions and the weighting coefficients related to the above-mentioned basis functions are calculated, it is possible to estimate the spectral characteristic of the subject by using the conventional color image sensor system. Also, the weighting coefficients have small capacity, which is advantageous for the saving and transfer operation. Furthermore, the spectral characteristic of the subject are calculated, which facilitates the color processing in the later stage and utilization to another purpose. By using the estimated spectral characteristic, the reproduced colors under an arbitrary illumination light are calculated without the influence from the illumination light for each shooting operation, and therefore the high accuracy white balance processing can be realized. Also, the reproduced colors under the illumination for each shooting operation are combined, and therefore it is possible to realize the subjectively preferable white balance processing.

It should be noted that according to the above-mentioned embodiment, the single CCD in which the Bayer-type primary color filter is arranged on the front face is presumed as the image sensor system, and the 10×10 pixel size is presumed as the local region, but application to the configuration is not necessarily limited to the above. For example, a color-difference line-sequential type complementary color filter, a two or three CCD is also possible. Also, a configuration of by reducing the local region size to increase the processing speed and a configuration of enlarging the local region size to improve the verification accuracy can also be adopted.

FIG. 2C illustrates a configuration of the color-difference line-sequential type complementary color filter. Herein, a local region having 8×8 pixels of the color-difference line-sequential type complementary color filter is illustrated. The color-difference line-sequence method has 2×2 pixels as a basic unit, and cyan (Cy), magenta (Mg), yellow (Ye), and green (G) are arranged for one pixel each. It should be noted that the positions of M and G are inverted every line. Also, the size of the local region is set as 8×8 pixels, and the target region comprises $G_{33}$, $Mg_{43}$, $Ye_{34}$, and $Cy_{44}$. FIG. 2D shows separation into luminance/color-difference signals from the local region of FIG. 2C. In this case, the total number of the neighborhood regions is 48 as illustrated in FIG. 2D. Also, the luminance signal Y and the color-difference signals Cb and Cr in the target regions are calculated through Expression (10).

$$Y = G_{33} + Mg_{43} + Ye_{34} + Cy_{44}$$

$$Cb = (Mg_{43} + Cy_{44}) - (G_{33} + Ye_{34})$$

$$Cr = (Mg_{43} + Ye_{34}) - (G_{33} + Cy_{44}) \quad (10)$$

In addition, according to the above-mentioned embodiment, the configuration of integrating with the image pickup unit composed of the lens system 100, the aperture 101, the CCD 102, the temperature sensor 103, the GAIN 104, the A/D 105, the PRE-WB unit 107, the exposure control unit 108, the focus control unit 109, the AF motor 110, and the flash lamp 120 is adopted, but is not necessarily limited to the above. For example, as illustrated in FIG. 11, the two types of the image signals captured by the separate image pickup unit can be processed in a raw data mode (hereinafter, which is abbreviated as Raw data) and further also processed from the recording medium such as the memory card in which the additional information such as the image pickup condition and the spectral characteristic related to the image sensor system is recorded in the header part.

FIG. 11 illustrates a mode in which with respect to the configuration illustrated in FIG. 1, the lens system 100, the aperture 101, the CCD 102, the temperature sensor 103, the GAIN 104, the A/D 105, the PRE-WB unit 107, the exposure control unit 108, the focus control unit 109, the AF motor 110, and the flash lamp 120 are omitted, and an input unit 600 and a header information analysis unit 601 are added. The basic configuration is equivalent to that of FIG. 1, and the same configuration part will be allocated with the same name and reference numeral. Hereinafter, only a different part will be described.

In FIG. 11, the input unit 600 is connected to the buffer 106 and the header information analysis unit 601. The control unit 118 is bi-directionally connected to the input unit 600 and the header information analysis unit 601. By starting a reproduction processing via an external I/F unit 119 such as a mouse or a keyboard, the signal and the header information saved in the recording medium such as the memory card are read from the input unit 600. The signal from the input unit 600 is transferred to the buffer 106, and the header information is transferred to the header information analysis unit 601. The header information analysis unit 601 extracts the information for each shooting operation from the header information to be transferred to the control unit 118. The subsequent processing is similar to that of FIG. 1.

Furthermore, according to the above-mentioned embodiment, the processing based on hardware is presumed, but is not necessarily limited to the above.

For example, such a configuration can also be adopted that the two types of image signals from the CCD 102 are unprocessed and outputted as Raw data, the image pickup condition, the spectral characteristic related to the image sensor system, and the like from the control unit 118 are outputted as the header information, and the information is processed by separate software.

FIG. 12A illustrates a flowchart related to a software processing of a signal processing according to the first embodiment of the present invention. FIG. 12A is a flow of the entire processing. In step S1, the two types of image signals and the header information such as the image pickup condition and the spectral characteristic related to the image sensor system are read. In step S2, the local regions including the target region shown in FIG. 2A are sequentially extracted from the two types of image signals. In step S3, the reliability is calculated as will be separately described. In step S4, the image signal is corrected on the basis of the reliability as will be separately described. In step S5, the spectral characteristic is estimated as will be separately described. In step S6, the color processing is performed on the basis of the estimated spectral characteristic as will be separately described. In step S7, it is determined whether the extraction for all the local regions is completed, and in a case where the extraction is not completed, the flow is branched to step S2, and in a case where the extraction is completed, the flow is branched to step S8. In step S8, a known edge emphasis processing, a known compression processing, or the like is performed. In step S9, the signal after the processing is outputted to end.

FIG. 12B is the flowchart related to the reliability verification in the above-mentioned step S3. In step S20, the luminance signal and the color-difference signal shown in FIG. 2B are calculated from the local region on the basis of Expression (1). In step S21, on the basis of the luminance signal, the noise amount related to the target region is calculated. The above-mentioned noise amounts are independently calculated for each of the two local regions and a larger one of the noise amounts is selected. In step S22, on the basis of the luminance signal, the edge amount related to the target region is calculated. The edge amounts are independently calculated for each of the two local regions, and one having the larger edge amount is selected. In step S23, on the basis of the color-difference signal, a standard deviation of the hue signals in the local region is calculated. It should be noted that the hue signal is calculated by Expression (2). The standard deviation of the hue signals is calculated for each of the two local regions, and one having the larger standard deviation is selected. In step S24, on the basis of the luminance signal, the motion amount related to the target region is calculated. In step S25, the reliability with respect to the target region is calculated on the basis of the above-mentioned noise amount, the edge amount, the standard deviation of the hue signals, and the motion amount from Expression (3).

FIG. 12C is the flowchart related to the image signal correction in the above-mentioned step S4. In step S30, the signal in the local region is separated, as illustrated in FIG. 5B, into the respective color signals. In step S31, on the basis of the reliability, from the relation shown in FIG. 7, the filter used for the smoothing processing is selected. In step S32, on the basis of the selected filter, the filter coefficient shown in FIGS. 6A to 6D is read. In step S33, the smoothing processing is performed for each color signal on the basis of the read filter coefficient. In step S34, the synthesis into the target region is performed from the respective color signals on which the smoothing processing is performed as illustrated in FIG. 5C.

FIG. 12D is the flowchart related to the spectral characteristic estimation in the above-mentioned step S5. In step S40, the difference processing shown in Expression (4) is performed between the two target regions. In step S41, the inverse matrix of the system matrix in the image sensor system $Sys^{-1}$ shown in Expression (6) is read. In step S42, the weighting coefficients with respect to the basis functions for approximating the spectral reflectance characteristic of the subject are calculated on the basis of Expression (6).

FIG. 12E is the flowchart related to the color processing in the above-mentioned step S6. In step S50, the three types of basis functions for approximating the spectral sensitivity characteristic of the image sensor system and the spectral reflectance characteristic of the subject are read. In step S51, the spectral emissivity characteristic of the light source is read. In step S52, on the basis of Expression (7), the reproduced colors are calculated. In step S53, combining with the original signal is performed on the basis of Expression (8).

Second Embodiment

Figure 13:
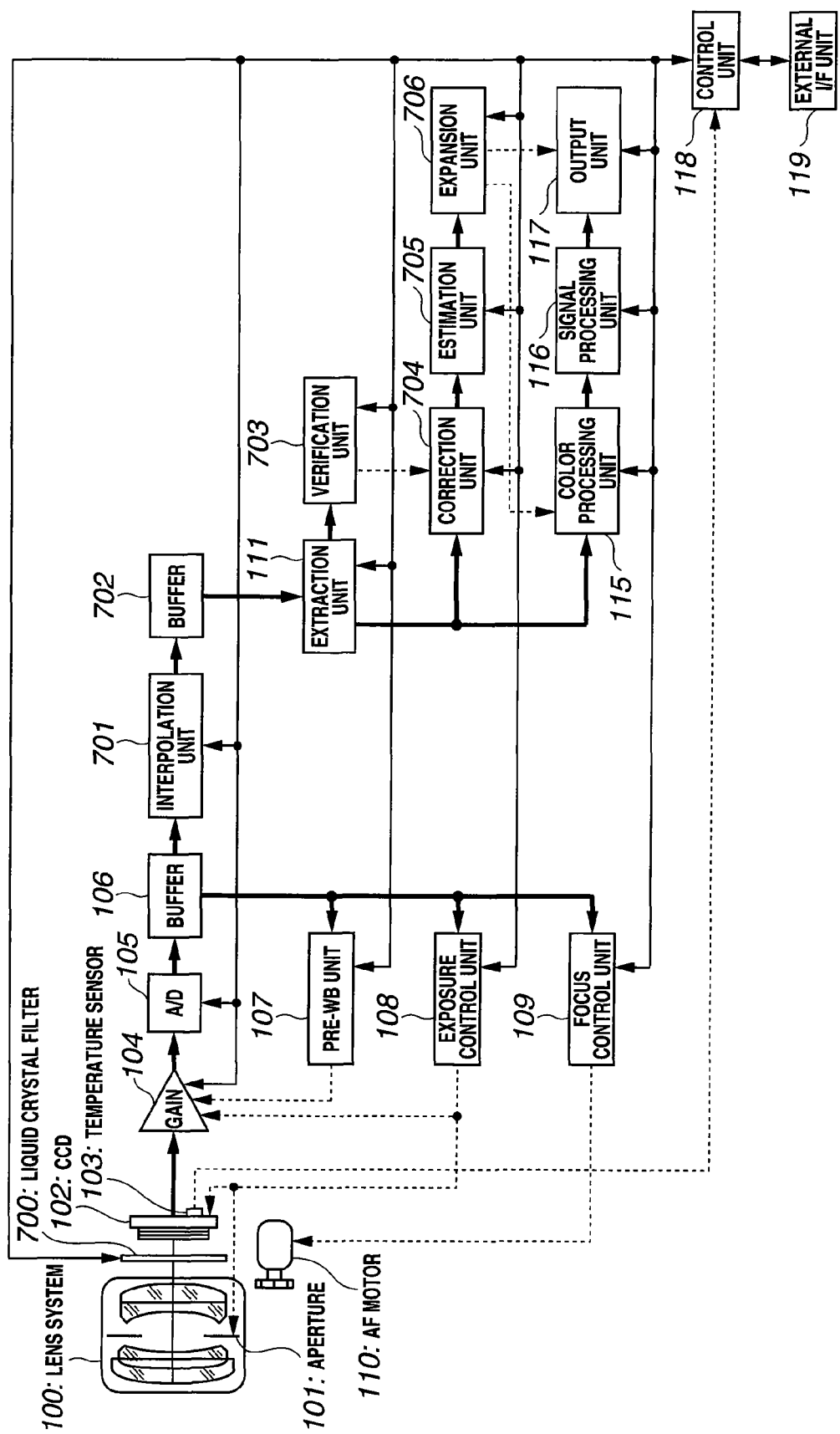
FIG. 13 is a configuration diagram of an image pickup system according to a second embodiment of the present invention.
Figure 16:
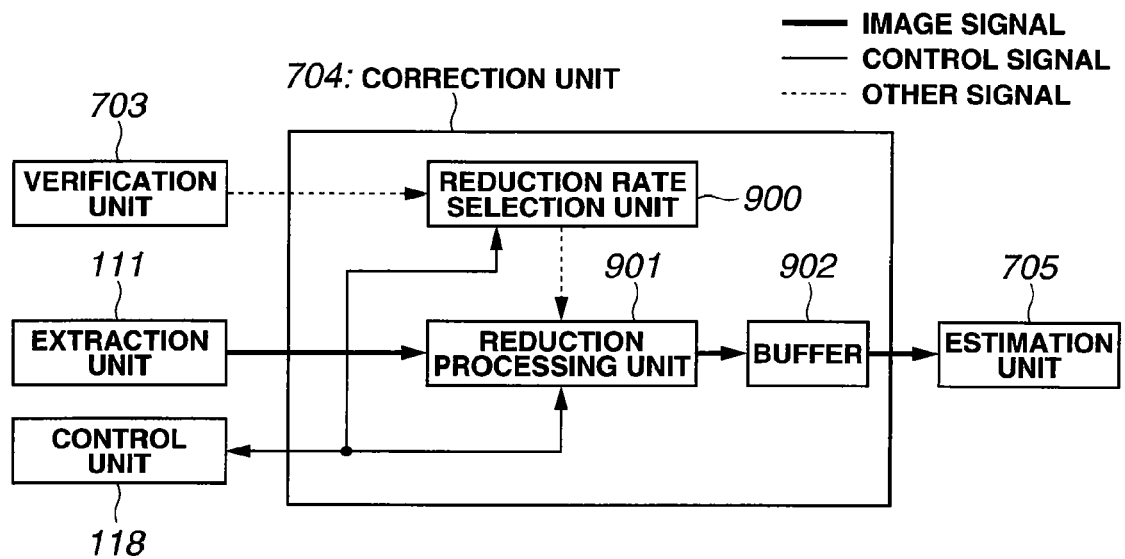
FIG. 16 is a configuration diagram of a correction unit in FIG. 13.
Figure 17:
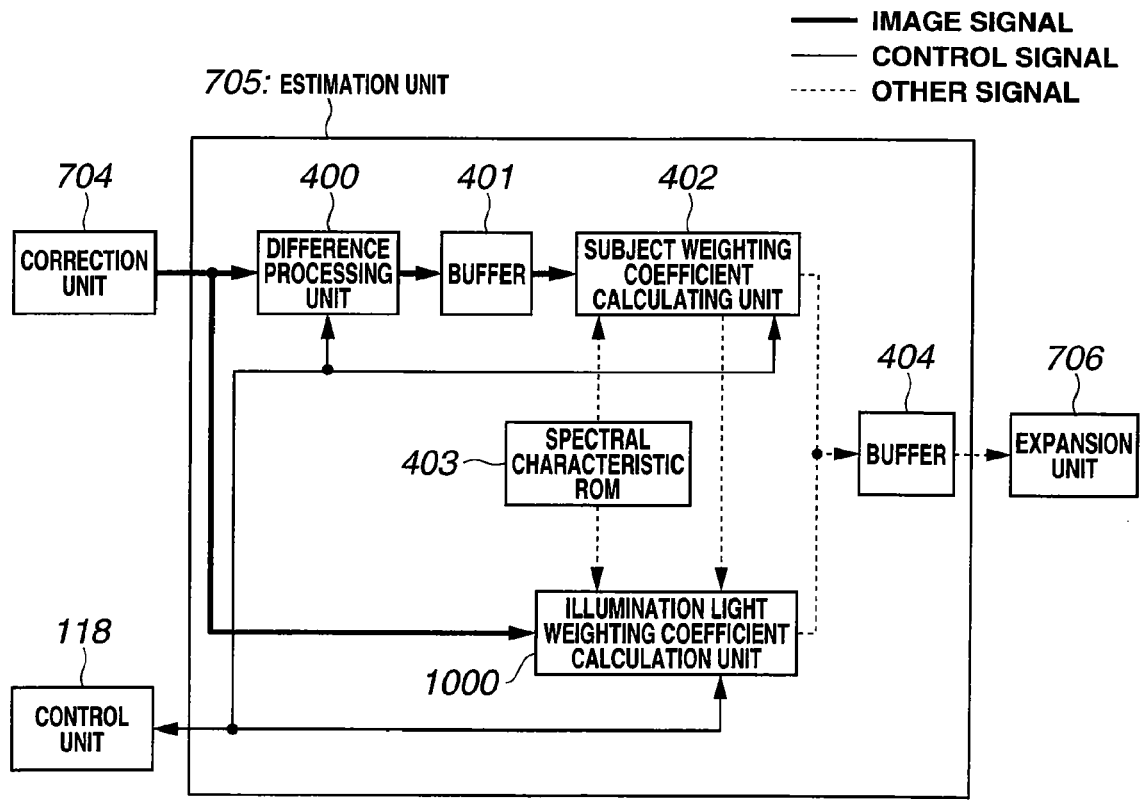
FIG. 17 is a configuration diagram of an estimation unit in FIG. 13.
Figure 18A:
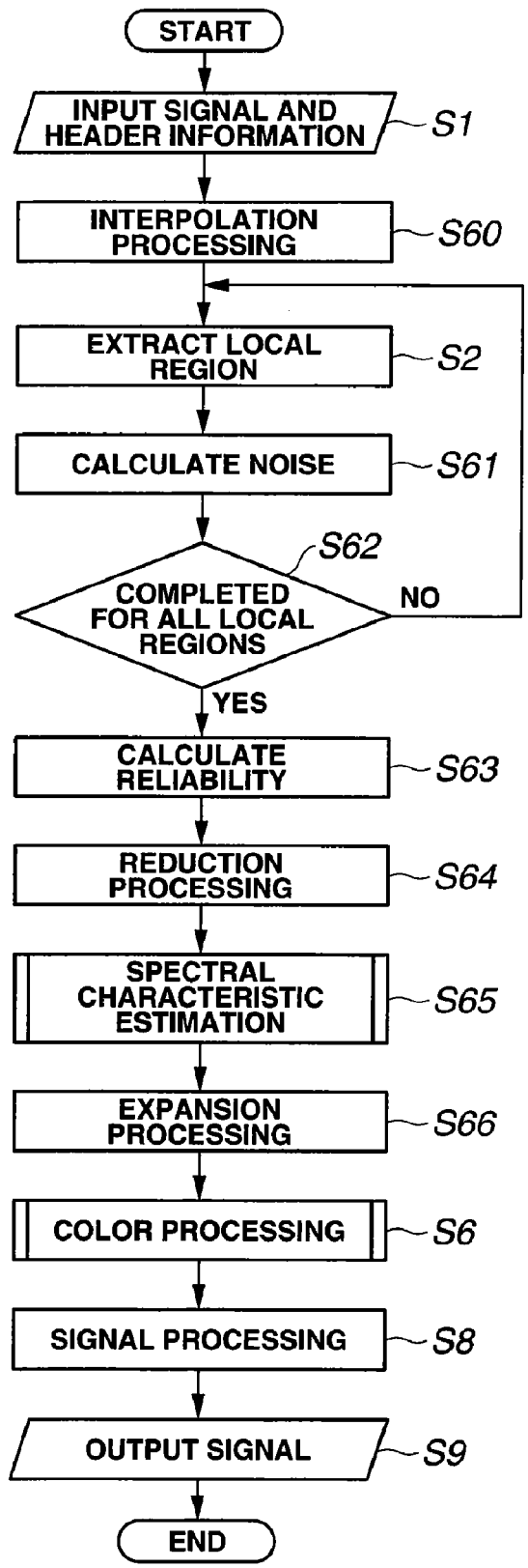
FIGS. 18A and 18B are flowcharts of a signal processing according to the second embodiment of the present invention.
Figure 18B:
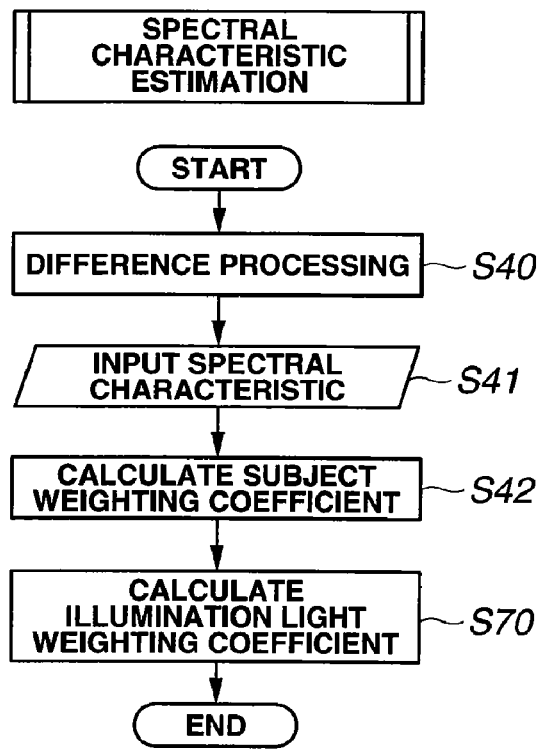

FIGS. 13 to 18B relate to a second embodiment of the present invention: FIG. 13 is a configuration diagram of an image pickup system according to the second embodiment of the present invention, FIGS. 14A and 14B are explanatory diagrams related to a local region, FIG. 15 is a configuration diagram of a verification unit, FIG. 16 is a configuration diagram of a correction unit, FIG. 17 is a configuration diagram of an estimation unit, and FIGS. 18A and 18B are flowcharts of a signal processing according to the second embodiment of the present invention.

[Configuration]

FIG. 13 is a configuration diagram of the image pickup system according to the second embodiment of the present invention. The present embodiment has a configuration in which with respect to the first embodiment shown in FIG. 1, a liquid crystal filter 700, an interpolation unit 701, a buffer 702, and an expansion unit 706 constituting expansion processing means are added, the verification unit 112 is replaced by a verification unit 703, the correction unit 113 is replaced by a correction unit 704, the estimation unit 114 is replaced by an estimation unit 705, and the flash lamp 120 is omitted. The basis configuration is equivalent to that of the first embodiment, and the same configuration will be allocated with the same name and reference numeral. Hereinafter, only a different part will be described.

An image signal captured via the lens system 100, the aperture 101, the liquid crystal filter 700, and the CCD 102 is amplified by the GAIN 104, converted into a digital signal by the A/D 105, and transferred to the buffer 106. The buffer 106 is connected to the PRE-WB unit 107, the exposure control unit 108, the focus control unit 109, and the interpolation unit 701. The interpolation unit 701 is connected via the buffer 702 to the extraction unit 111. The extraction unit 111 is connected to the verification unit 703, the correction unit 704, and the color processing unit 115. The verification unit 703 is connected to the correction unit 704, the correction unit 704 is connected to the estimation unit 705, and the estimation unit 705 is connected to the expansion unit 706. The expansion unit 706 is connected to the color processing unit 115 and the output unit 117. The control unit 118 is bi-directionally connected to the liquid crystal filter 700, the interpolation unit 701, the verification unit 703, the correction unit 704, the estimation unit 705, and the expansion unit 706. The control unit 118 and the liquid crystal filter 700 constitute control means for performing such a control that a predetermined spectral characteristic in the color image sensor system is changed in a time series manner to cause a plurality of shooting operations.

[Operation]

The operation is basically similar to the first embodiment, and only a different part will be described. In FIG. 13, a description will be given along a flow of the signal.

By half pressing the shutter button via the external I/F unit 119, the pre-image pickup mode is entered. An image signal captured via the lens system 100, the aperture 101, and the liquid crystal filter 700 is transferred to the buffer 106 via the GAIN 104 and the A/D 105. The liquid crystal filter 700 at this time is open, and a normal shooting operation is performed. In the PRE-WB unit 107, the exposure control unit 108, and the focus control unit 109, similarly to the first embodiment, the image pickup condition for the real shooting is set.

Next, by fully pressing the shutter button via the external I/F unit 119, the real shooting for the first time is performed. Even in the real shooting for the first time, the liquid crystal filter 700 is open (turned on), and the normal shooting operation is performed. Next, such a control is performed so that the control unit 118 closes the liquid crystal filter 700 (turned off), and the real shooting operation for the second time is performed. The liquid crystal filter 700 is not neutral gray, but is presumed to be a colored filter having a bias in the visible range (for example, which is similar to the spectrum of the flash lamp light emission). The image signals for the first time and the second time are transferred to the buffer 106.

The interpolation unit 701 performs a known interpolation processing on the image signals for the first time and the second time, and generates a three signal in which all the RGB three signals are together on the basis of the control of the control unit 118. FIG. 14A illustrates a configuration of a local region of 5×5 pixels after the interpolation processing. In the interpolation unit 701, the three image signal illustrated in FIG. 14A is generated. The two three image signals generated in the interpolation unit 701 are transferred to the buffer 702. The extraction unit 111 sequentially extracts the 5×5 pixel size local region with the 1×1 pixel target region shown in FIG. 14A as the center for each of the RGB three signals on the basis of the control of the control unit 118. It should be noted that the above-mentioned local region is extracted at the same position from the image signal of the real shooting for the first time and the image signal of the real shooting for the second time, and therefore two local regions exist.

The verification unit 703 reads the above-mentioned local two regions from the extraction unit 111 and verifies the reliability in the spectral characteristic estimation on the basis of the control of the control unit 118. The above-mentioned processings of the extraction unit 111 and the verification unit 112 are performed for each local region unit in synchronization with each other on the basis of the control of the control unit 118. After the verification for the reliability is completed for all the local regions, the verification unit 112 transfers the result on the reliability related to the entire image signal to the correction unit 704. The correction unit 704 reads the above-mentioned two image signals from the extraction unit 111, reads the result on the reliability from the verification unit 703, and performs the correction processing on the above-mentioned two image signals. It should be noted that according to the present embodiment, the reduction processing is presumed as the above-mentioned correction processing. The corrected two image signals are transferred to the estimation unit 705.

The estimation unit 705 reads the corrected two image signals from the correction unit 704 and estimates the spectral characteristic related to the subject or the illumination light on the basis of the control of the control unit 118. The estimated spectral characteristic is transferred to the expansion unit 706. The expansion unit 706 performs the expansion processing so that the estimated spectral characteristic is expanded to the original size from the image pickup device on the basis of the control of the control unit 118. The spectral characteristic on which the expansion processing is performed is transferred to the color processing unit 115. It should be noted that as occasion demands, the estimated spectral characteristic may be transferred to the output unit 117 can also be separately saved in a recording medium not shown in the drawing.

FIG. 15 illustrates a configuration example of the verification unit 703: which has such a configuration that the luminance color-difference separation unit 200 of the verification unit 112 illustrated in FIG. 3 according to the first embodiment is replaced by a luminance color-difference separation unit 800, the reliability calculation unit 207 is replaced by a reliability calculation unit 801, and the edge calculation unit 203, the hue calculation unit 204, and the motion calculation unit 205 are omitted. The basis configuration is equivalent to the verification unit 112 illustrated in FIG. 3, and the same configuration part will be allocated with the same name and reference numeral. Hereinafter, only a different part will be described.

In FIG. 15, the extraction unit 111 is connected via the luminance color-difference separation unit 800 to the buffer 201. The buffer 201 is connected via the noise calculation unit 202 and the buffer 206 to the reliability calculation unit 801. The reliability calculation unit 801 is connected the correction unit 704. The control unit 118 is bi-directionally connected to the luminance color-difference separation unit 800 and the reliability calculation unit 801. The luminance color-difference separation unit 800 reads two local regions from the extraction unit 111 to separate into the luminance signal and the color-difference signal on the basis of the control of the control unit 118. The separation into the luminance signal and the color-difference signal is performed is performed from RGB three local regions of 5×5 pixels.

FIG. 14A illustrates a configuration of the 1×1 pixel target region in the local region composed of the RGB three signals according to the present embodiment and the 1×1 pixel neighborhood region. According to the present embodiment, $R_{22}$, $G_{22}$, and $B_{22}$ are presumed as the target region, and total 24 in the respective pixels including the target region are presumed as the neighborhood region. The luminance signal Y and the color-difference signals Cb and Cr in the target regions are calculated through Expression (11).

$$Y = G_{22}$$

$$Cb = B_{22} - G_{22}$$

$$Cr = R_{22} - G_{22} \quad (11)$$

Also in the neighborhood regions, the calculation is similarly performed. FIG. 14B illustrates the separation into the luminance/color-difference signals from the local region of FIG. 14A. As illustrated in FIG. 14B, from one local region, 25 luminance signal Y and color-difference signals Cb and Cr are calculated. The luminance signals and the color-difference signals calculated from the two local regions are transferred to the buffer 201. The noise calculation unit 202 reads the luminance signals from the buffer 201, reads the ISO sensitivity, the simplified white balance coefficient, and the exposure condition for each shooting operation from the control unit 118, reads the temperature information from the temperature sensor 103, and calculates the noise amount in the target region on the basis of the control of the control unit 118. The above-mentioned noise amounts are independently calculated for each of the two local regions. The noise calculation unit 202 selects a larger one of the calculated two noise amounts to be transferred to the buffer 206. On the basis of the control of the control unit 118, the above-mentioned procedure is performed in all the local regions, and the noise amount of all the local regions are recorded on the buffer 206. After the calculation for the noise amount in all the local regions is completed, on the basis of the control of the control unit 118, the reliability calculation unit 801 reads the noise amounts from the buffer 206 and calculates an average value $N_{AV}$. The calculated average value $N_{AV}$ is transferred to the correction unit 704.

FIG. 16 illustrates a configuration example of the correction unit 704 which is composed of a reduction rate selection unit 900, a reduction processing unit 901, and a buffer 902. The verification unit 703 is connected to the reduction rate selection unit 900. The reduction rate selection unit 900 and the extraction unit 111 are connected to the reduction processing unit 901. The reduction processing unit 901 is connected via the buffer 902 to the estimation unit 705. The control unit 118 is bi-directionally connected to the reduction rate selection unit 900 and the reduction processing unit 901. On the basis of the control of the control unit 118, the reduction rate selection unit 900 reads the average value of the noise amounts $N_{AV}$ from the verification unit 703 as the reliability. After that, from the calculated average value $N_{AV}$, on the basis of Expression (12), a reduction rate Rate with respect to the image signal is calculated. Expression (12) shows an example of calculating the reduction rate.

$$\text{Rate} = a \cdot N_{AV}^2 + b \cdot N_{AV} + c \quad (12)$$

Herein, a, b, and c denote predetermined constant terms. In Expression (12), the reduction rate Rate is set to take a larger value as the noise amount is larger. In this manner, it is practical to set the reduction rate Rate on the basis of the noise amount, but the reduction rate Rate is not necessarily limited to the above-mentioned Expression (12). That is, by also taking into account the edge amount, the hue, and the motion amount, the reduction rate Rate may be determined. The calculated reduction rate Rate is transferred to the reduction processing unit 901. The reduction processing unit 901 reads the reduction rate Rate from the reduction rate selection unit 900 and sequentially reads two image signals from the extraction unit 111 on the basis of the control of the control unit 118. The read two image signals are subjected to the reduction processing on the basis of the reduction rate Rate and transferred to the buffer 902. The reduced two image signals on the buffer 902 are, as occasion demands, transferred to the estimation unit 705.

FIG. 17 illustrates a configuration example of the estimation unit 705, in which the estimation unit 114 shown in FIG. 8 according to the first embodiment is added with an illumination light weighting coefficient calculation unit 1000. The basis configuration is equivalent to the estimation unit 114 illustrated in FIG. 8, and the same configuration will be allocated with the same name and reference numeral. Hereinafter, only a different part will be described.

In FIG. 17, the correction unit 704 is connected to the difference processing unit 400 and the illumination light weighting coefficient calculation unit 1000. The spectral characteristic ROM 403 is connected to the subject weighting coefficient calculating unit 402 and the illumination light weighting coefficient calculation unit 1000. The illumination light weighting coefficient calculation unit 1000 is connected to the buffer 404. The buffer 404 is connected to the expansion unit 706. The control unit 118 is bi-directionally connected to the illumination light weighting coefficient calculation unit 1000. On the basis of the control of the control unit 118, the difference processing unit 400 reads the two image signals on which the reduction processing is performed from the correction unit 704. After that, by performing the difference between the image signal on which the reduction processing is performed for the first shooting operation and the image signal on which the reduction processing is performed for the second shooting operation, the RGB three signals $CS_R$, $CS_G$, and $CS_B$ equivalent to a case where the shooting operation is performed by only using transmitted light of the liquid crystal filter 700 are obtained. The RGB three signals $CS_R$, $CS_G$, and $CS_B$ on which the difference processing is performed are transferred to the buffer 401. The spectral characteristic ROM 403 records the information related to the spectral characteristic of the image sensor system. As the spectral characteristics, the spectral sensitivity characteristic of the image sensor system $S_R(\lambda)$, $S_G(\lambda)$, and $S_B(\lambda)$, the three types of basis functions $O_1(\lambda)$, $O_2(\lambda)$, and $O_3(\lambda)$ for approximating the spectral reflectance characteristic of the subject $O(\lambda)$, the three types of basis functions $I_1(\lambda)$, $I_2(\lambda)$, and $I_3(\lambda)$ for approximating the spectral emissivity characteristic of the illumination light $I(\lambda)$ used in an illumination light weighting coefficient calculation unit 1000 described below, and the inverse matrix of the system matrix in the image sensor system $Sys^{-1}$ shown in Expression (6) are recorded. It should be noted that the characteristic of the spectral emissivity characteristic of the flash lamp light $IS(\lambda)$ in the system matrix of the above-mentioned Expression (6) is replaced by the spectral transmission characteristic of the liquid crystal filter 700 according to the present embodiment. On the basis of the control of the control unit 118, the subject weighting coefficient calculating unit 402 reads the RGB three signals $CS_R$, $CS_G$, and $CS_B$ on which the difference processing is performed from the buffer 401 for each pixel unit, reads from the inverse matrix of the system matrix $Sys^{-1}$ from the spectral characteristic ROM 403, and calculates the weighting coefficients $o_1, o_2$, and $o_3$ with respect to the basis functions on the basis of Expression (6). For all the pixels of the image signal on which the reduction processing is performed, the above-mentioned weighting coefficients are calculated and transferred to the buffer 404. On the other hand, the illumination light weighting coefficient calculation unit 1000 performs a processing of estimating the spectral characteristic of the illumination light $I(\lambda)$. The spectral emissivity characteristic of the illumination light $I(\lambda)$ can be approximated by using the weighting coefficients $i_1, i_2$, and $i_3$ with respect to the three types of basis functions $I_1(\lambda)$, $I_2(\lambda)$, and $I_3(\lambda)$ as shown in (13).

$$I(\lambda) = i_1 \cdot I_1(\lambda) + i_2 \cdot I_2(\lambda) + i_3 \cdot I_3(\lambda) \quad (13)$$

The above-mentioned weighting coefficients $i_1, i_2$, and $i_3$ are calculated by Expression (14).

The illumination light weighting coefficient calculation unit 1000 reads the image signals for the first time $CL_R$, $CL_G$, and $CL_B$ on which the reduction processing is performed from the correction unit 704 on the basis of the control of the control unit 118. The image signals for the first time are image signals captured by the illumination light under the external environment in a state where the liquid crystal filter 700 is opened. Also, the weighting coefficients $o_1, o_2$, and $o_3$ are read from the subject weighting coefficient calculating unit 402, and the spectral sensitivity characteristic of the image sensor system $S_R(\lambda)$, $S_G(\lambda)$, and $S_B(\lambda)$, the basis functions for the subject $O_1(\lambda)$, $O_2(\lambda)$, and $O_3(\lambda)$, and the basis functions for the illumination light $I_1(\lambda)$, $I_2(\lambda)$, and $I_3(\lambda)$ are read from the spectral characteristic ROM 403. After that, on the basis of Expression (14), the weighting coefficients with respect to the basis functions $i_1, i_2$, and $i_3$ are calculated. For all the pixels of the image signal on which the reduction processing is performed, the above-mentioned weighting coefficients are calculated and transferred to the buffer 404. The weighting coefficients in the buffer 404 are transferred to the expansion unit 706, and the expansion processing is performed so that the same size as the pixel number of the original image signals is realized.

With the above-mentioned configuration, on the basis of the noise included in the image signal, the reliability is calculated, on the basis of the reliability, the selected reduction rate is selected, and after the reduction rate processing, the estimation for the spectral characteristic is performed. For this reason, it can be guaranteed that the estimation accuracy for the spectral characteristic is set within an appropriate range. Also, as the estimation for the spectral characteristic is performed on the basis of the reduced signal, it is possible to execute the processing at a high speed. The estimated spectral characteristic is expanded to the same size as the original image signal, and therefore, regarding the processing in the later stage, the affinity and compatibility to the conventional image pickup system, and the decrease in the costs can be achieved. Furthermore, as the plurality of image signals having the different spectral characteristics in the time series manner, the liquid crystal filter in the light path is utilized, and without being affected from the distance to the subject, the intensity of the external illumination, and the like, it is possible to stably obtain the image signal. Also, as turning on and off of the liquid crystal filter can be performed at a high speed, it is possible to obtain the image signal with small motion blur even for the moving body. Also, modeling of the spectral characteristic that should be estimated is performed through linear combination of a small number of basis functions and the weighting coefficients related to the above-mentioned basis functions are calculated, and therefore it is possible to estimate the spectral characteristic of the subject by using the conventional color image sensor system. Also, the weighting coefficients have small capacity, which is advantageous for the saving and transfer operation.

It should be noted that according to the above-mentioned embodiment, such a configuration is adopted that the Bayer-type primary color filter is used as the image pickup device, but is not necessarily limited to the above. Similarly to the first embodiment, the color-difference line-sequential type complementary color filter can also be used, and the two or three image pickup device can also be used. In addition, the $$\begin{pmatrix} i_1 \\ i_2 \\ i_3 \end{pmatrix} = \begin{pmatrix} I_1(\lambda) \cdot \sum_{n=1,3} o_n O_n(\lambda) \cdot S_R(\lambda) & I_1(\lambda) \cdot \sum_{n=1,3} o_n O_n(\lambda) \cdot S_G(\lambda) & I_1(\lambda) \cdot \sum_{n=1,3} o_n O_n(\lambda) \cdot S_B(\lambda) \\ I_2(\lambda) \cdot \sum_{n=1,3} o_n O_n(\lambda) \cdot S_R(\lambda) & I_2(\lambda) \cdot \sum_{n=1,3} o_n O_n(\lambda) \cdot S_G(\lambda) & I_2(\lambda) \cdot \sum_{n=1,3} o_n O_n(\lambda) \cdot S_B(\lambda) \\ I_3(\lambda) \cdot \sum_{n=1,3} o_n O_n(\lambda) \cdot S_R(\lambda) & I_3(\lambda) \cdot \sum_{n=1,3} o_n O_n(\lambda) \cdot S_G(\lambda) & I_3(\lambda) \cdot \sum_{n=1,3} o_n O_n(\lambda) \cdot S_B(\lambda) \end{pmatrix}^{-1} \begin{pmatrix} CL_R \\ CL_G \\ CL_B \end{pmatrix} \quad (14)$$

two of the image signals captured by the separate image pickup unit can also be processed in the unprocessed Raw data mode and further from the recording medium such as the memory card in which the additional information such as the image pickup condition and the spectral characteristic related to the image sensor system is recorded in the header part.

Furthermore, according to the above-mentioned embodiment, the processing based on hardware is presumed, but is not necessarily limited to the above. For example, such a configuration can also be adopted that the two types of image signals from the CCD 102 are unprocessed and outputted as Raw data, the image pickup condition, the spectral characteristic related to the image sensor system, and the like from the control unit 118 are outputted as the header information, and the information is processed by separate software.

FIG. 18A illustrates a flowchart related to a software processing of a signal processing according to the second embodiment of the present invention. FIG. 18A is a flow of the entire processing. It should be noted that the same processing step S as that in the flowchart for the signal processing according to the first embodiment shown in FIG. 12A is allocated with the same reference numeral. In step S1, the two types of image signals and the header information such as the image pickup condition and the spectral characteristic related to the image sensor system are read. In step S60, the interpolation processing is performed and a three image signal is generated. In step S2, the local regions including the target region shown in FIG. 14A are sequentially extracted from the two types of image signals. In step S61, the noise amount related to the target region is calculated. In step S62, it is determined whether the extraction for all the local regions is completed, and in a case where the extraction is not completed, the flow is branched to step S2, and in a case where the extraction is completed, the flow is branched to step S63. In step S63, the average value of the noise amounts is calculated as the reliability. In step S64, on the basis of the reliability, the reduction rate shown in Expression (12) is calculated, and the reduction processing is performed on two types of the image signals. In step S65, the spectral characteristic is estimated as will be separately described. In step S66, the expansion processing is performed so that the estimated spectral characteristic is expanded to the same size as the original image signal. In step S6, as illustrated in FIG. 12E, on the basis of the estimated spectral characteristic, the color processing is performed. In step S8, a known edge emphasis processing, a known compression processing, or the like is performed. In step S9, the signal after the processing is outputted to be ended.

FIG. 18B is a flowchart related to the spectral characteristic estimation in the above-mentioned step S65. It should be noted that the same processing step S as that in the flowchart for the spectral characteristic estimation according to the first embodiment shown in FIG. 12D is allocated with the same reference numeral. In step S40, the difference processing is performed between the two image signals on which the reduction processing is performed. In step S41, the spectral sensitivity characteristic of the image sensor system, the basis functions for the subject, the basis functions for the illumination light, the inverse matrix of the system matrix in the image sensor system shown in Expression (6) is read. In step S42, on the basis of Expression (6), the weighting coefficients with respect to the basis functions for approximating the spectral reflectance characteristic of the subject are calculated. In step S70, on the basis of Expression (14), the weighting coefficients with respect to the basis functions for approximating the spectral reflectance characteristic of the illumination light are calculated.

Third Embodiment

Figure 20:
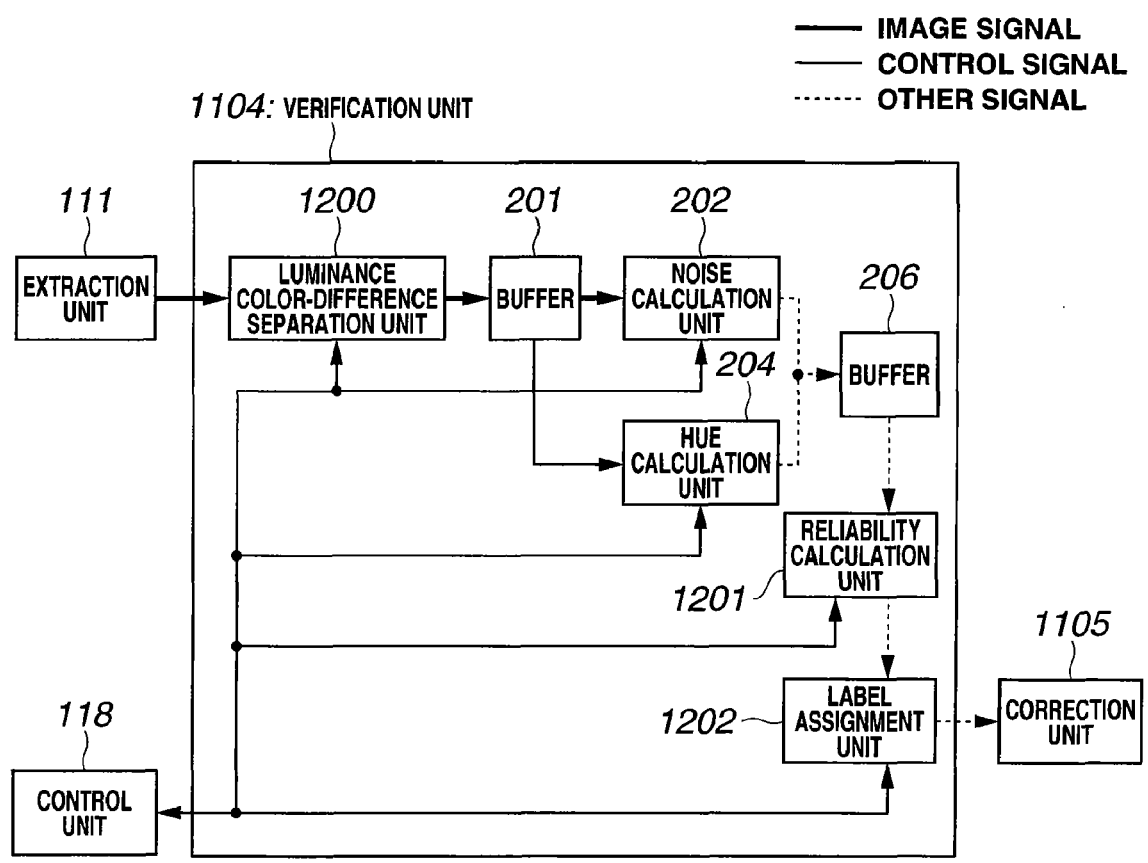
FIG. 20 is a configuration diagram of a verification unit in FIG. 19.
Figure 21:
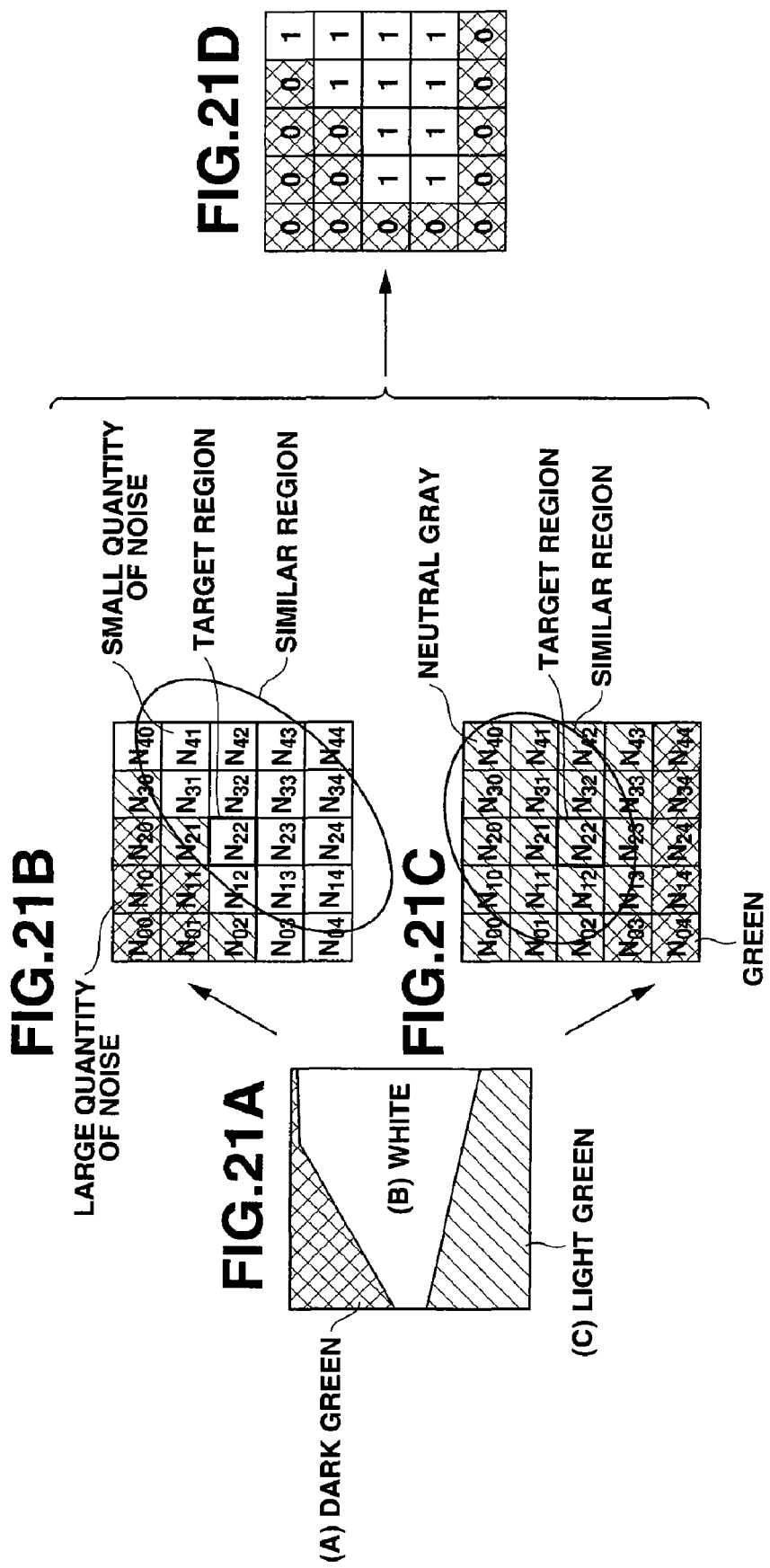
FIGS. 21A to 21D are explanatory diagrams related to label assignment.
Figure 22:
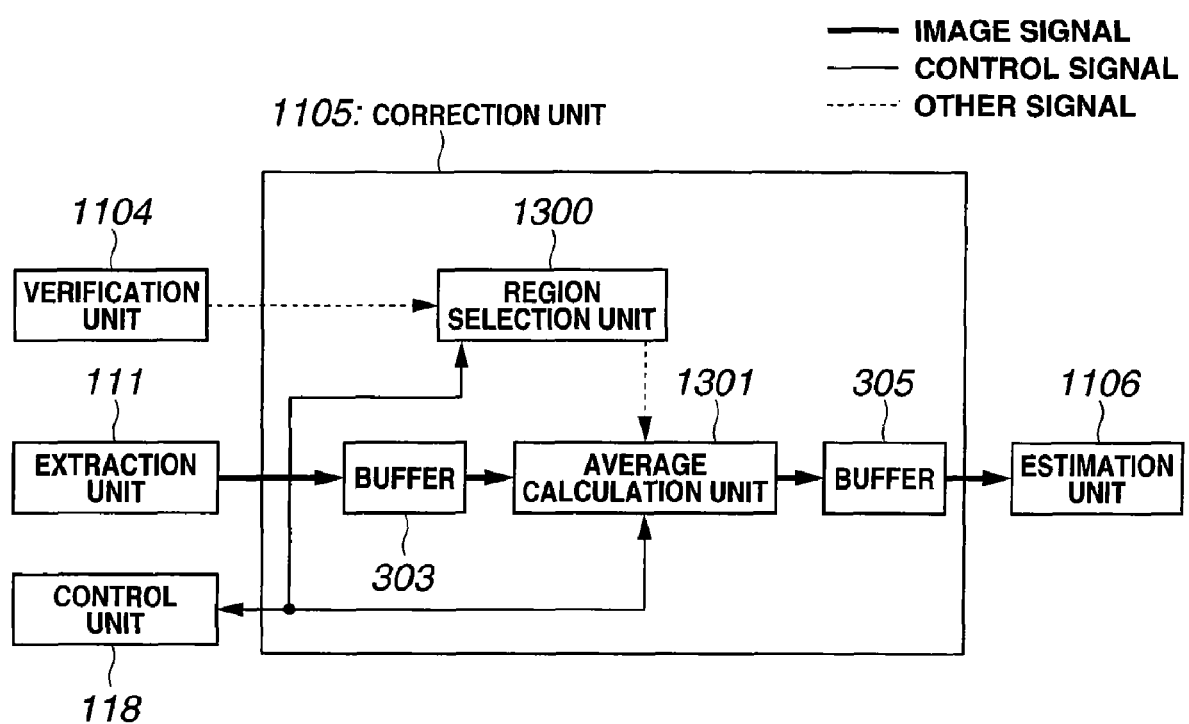
FIG. 22 is a configuration diagram of a correction unit in FIG. 19.
Figure 23:
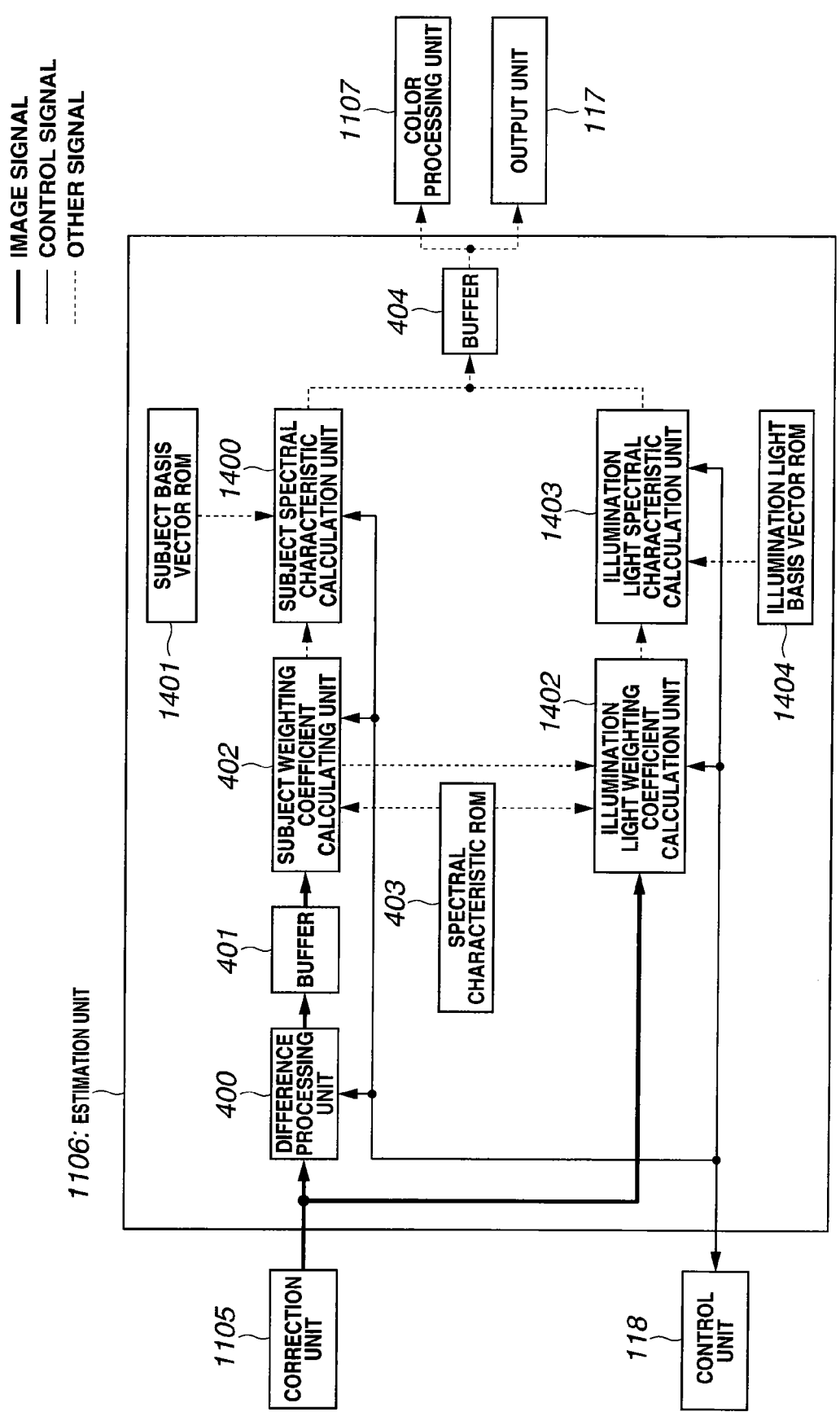
FIG. 23 is a configuration diagram of an estimation unit in FIG. 19.
Figure 24:
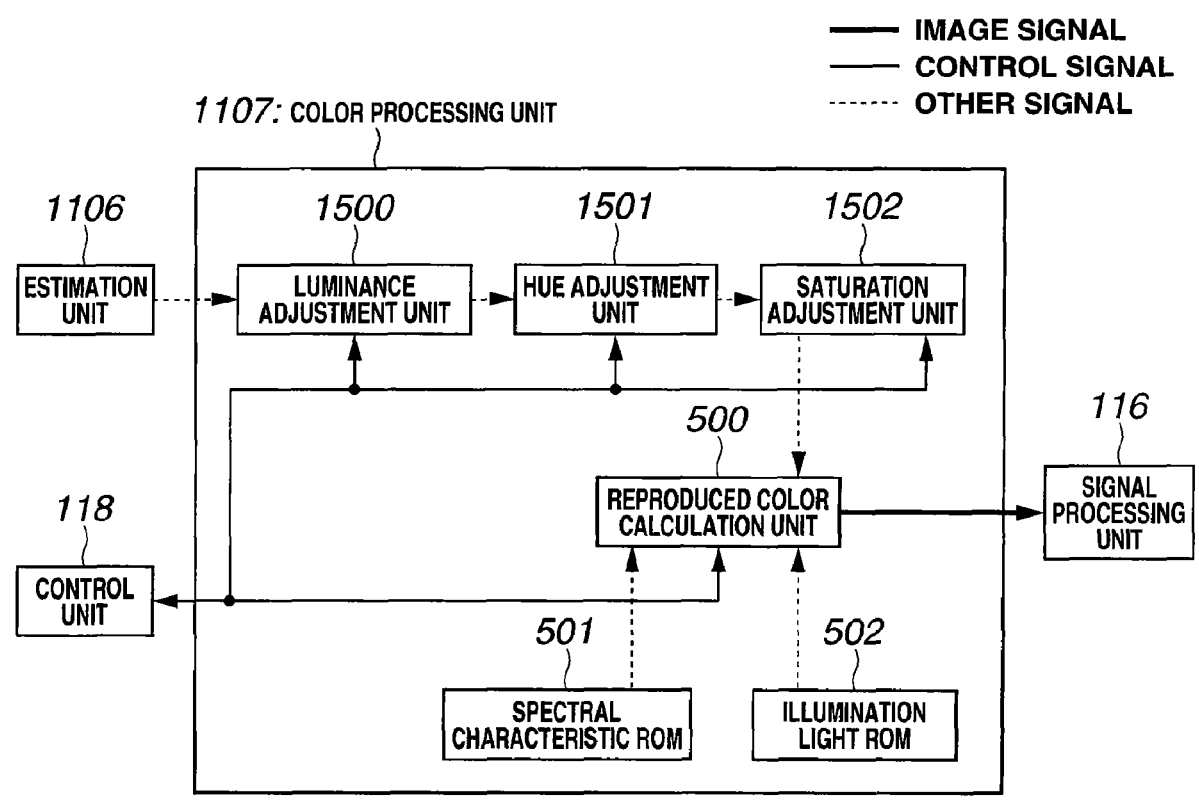
FIG. 24 is a configuration diagram of a color processing unit in FIG. 19.

FIGS. 19 to 25E relate to a third embodiment of the present invention: FIG. 19 is an image pickup configuration diagram according to the third embodiment, FIG. 20 is a configuration diagram of a verification unit, FIGS. 21A to 21D are explanatory diagrams related to label assignment, FIG. 22 is a configuration diagram of a correction unit, FIG. 23 is a configuration diagram of an estimation unit, FIG. 24 is a configuration diagram of a color processing unit, and FIGS. 25A to 25E are flowcharts of a signal processing according to the third embodiment of the present invention.

[Configuration]

FIG. 19 is a configuration diagram of the third embodiment of the present invention. The present embodiment has a configuration in which with respect to the first embodiment shown in FIG. 1, an interpolation unit 1102 and a buffer 1103 are added, the CCD 102 is replaced by a CCD1 1100 and a CCD2 1101, the verification unit 112 is replaced by a verification unit 1104, the correction unit 113 is replaced by a correction unit 1105, the estimation unit 114 is replaced by an estimation unit 1106, the color processing unit 115 is replaced by a color processing unit 1107, and the flash lamp 120 is omitted. The basis configuration is equivalent to that of the first embodiment, and the same configuration part will be allocated with the same name and reference numeral. Hereinafter, only a different part will be described.

The light flux incident via the lens system 100 and the aperture 101 is branched into two direction by a prism system and reaches the CCD1 1100 and the CCD2 1101. The image signals from the CCD1 1100 and the CCD2 1101 are amplified by the GAIN 104, converted into the digital signals by the A/D 105, and transferred to the buffer 106. The buffer 106 is connected to the PRE-WB unit 107, the exposure control unit 108, the focus control unit 109, and the interpolation unit 1102. The interpolation unit 1102 is connected via the buffer 1103 to the extraction unit 111. The extraction unit 111 is connected to the verification unit 1104 and the correction unit 1105. The verification unit 1104 is connected to the correction unit 1105, and the correction unit 1105 is connected to the estimation unit 1106. The estimation unit 1106 is connected to the color processing unit 1107 and the output unit 117. The color processing unit 1107 is connected to the signal processing unit 116. The control unit 118 is bi-directionally connected to the CCD 11100, the CCD2 1101, the interpolation unit 1102, the verification unit 1104, the correction unit 1105, the estimation unit 1106, and the color processing unit 1107. Furthermore, the signal from the temperature sensor 103 arranged in the vicinity of the CCD2 1101 is connected to the control unit 118.

[Operation]

The operation is basically similar to the first embodiment, and only a different part will be described. In FIG. 19, a description will be given along a flow of the signal.

By half pressing the shutter button via the external I/F unit 119, the pre-image pickup mode is entered. The light flux incident via the lens system 100 and the aperture 101 is branched into two direction by a prism system, and image signals are generated by the CCD1 1100 and the CCD2 1101. According to the present embodiment, the single CCD in which the Bayer-type primary color filter is arranged on the front face is presumed as both the CCD1 1100 and the CCD2 1101, but the spectral sensitivity characteristics thereof are set different from each other. The spectral transmission characteristics in the red (R), blue (B), and green (Gr, Gb) filters shown in FIG. 2A may be set different, or a colored filter may be arranged on the front face of the CCD2 1101. According to the present embodiment, it is presumed that the CCD1 100 has a normal spectral sensitivity characteristic, and the CCD2 1101 has a different spectral sensitivity characteristic. The image signals from the two CCDs are transferred via the GAIN 104 and the A/D 105 to the buffer 106. The image pickup condition for the real shooting is set in the PRE-WB unit 107, the exposure control unit 108, and the focus control unit 109 similarly to the first embodiment on the basis of the image signal from the CCD1 1100.

Next, by fully pressing the shutter button via the external I/F unit 119, the real shooting is performed. According to the present embodiment, the two image signals are obtained from the CCD1 1100 and the CCD2 1101 in the one real shooting, but for convenience of the description, the image signal from the CCD1 1100 is referred to as the image signal for the first time and the image signal from the CCD2 1101 is referred to as the image signal for the second time. The interpolation unit 1102 performs a known interpolation processing on the image signals for the first time and the second time, and generates the three signal in which all the RGB three signals are together on the basis of the control of the control unit 118. In the interpolation unit 701, the three image signal illustrated in FIG. 14A is generated. The two three image signals generated in the interpolation unit 1102 are transferred to the buffer 1103. The extraction unit 111 sequentially extracts the 5×5 pixel size local region with the 1×1 pixel target region shown in FIG. 14A as the center according to the second embodiment for each of the RGB three signals on the basis of the control of the control unit 118. It should be noted that the above-mentioned local region is extracted at the same position from the image signal for the first time and the image signal for the second time, and therefore two local regions exist.

The verification unit 1104 reads the above-mentioned local two regions from the extraction unit 111 and verifies the reliability in the spectral characteristic estimation on the basis of the control of the control unit 118. At this time, similarly to FIG. 14, the verification unit 1104 separates the image signal into the luminance signal and the color-difference signal and thereafter calculates the hue in addition to the calculation of the noise to calculate the reliability while taking into account the two including the noise and the hue. The result on the reliability is transferred to the correction unit 1105. On the basis of the control of the control unit 118, the correction unit 1105 reads the above-mentioned two local regions from the extraction unit 111, reads the result on the reliability from the verification unit 1104, and performs the correction processing on the above-mentioned two target regions.

The corrected two target regions are transferred to the estimation unit 1106. The estimation unit 1106 reads the corrected two target regions from the correction unit 1105 and estimates the spectral characteristic related to the subject or the illumination light on the basis of the control of the control unit 118. The estimated spectral characteristic is transferred to the color processing unit 1107. It should be noted that as occasion demands, the estimated spectral characteristic may be transferred to the output unit 117 and can also be separately saved in a recording medium not shown in the drawing. The color processing unit 1107 reads the estimated spectral characteristic from the estimation unit 1106 and performs a predetermined color processing on the basis of the control of the control unit 118. According to the present embodiment, the color processing in which the luminance processing, the hue processing, and the saturation processing are combined. The target regions on which the color processing is performed are sequentially transferred to the signal processing unit 116. The above-mentioned processings of the extraction unit 111, the verification unit 1104, the correction unit 1105, the estimation unit 1106, and the color processing unit 1107 are performed for each local region unit in synchronization with each other on the basis of the control of the control unit 118.

FIG. 20 illustrates a configuration example of the verification unit 1104, in which the verification unit 112 illustrated in FIG. 3 according to the first embodiment is added with a label assignment unit 1202, a luminance color-difference separation unit 200 is replaced by a luminance color-difference separation unit 1200, the reliability calculation unit 207 is replaced by a reliability calculation unit 1201, and the edge calculation unit 203 and the motion calculation unit 205 are omitted. The basis configuration is equivalent to the verification unit 112 illustrated in FIG. 3, and the same configuration part will be allocated with the same name and reference numeral. Hereinafter, only a different part will be described.

In FIG. 20, the extraction unit 111 is connected via the luminance color-difference separation unit 1200 to the buffer 201. The buffer 201 is connected to the noise calculation unit 202 and the hue calculation unit 204. The noise calculation unit 202 and the hue calculation unit 204 is connected to the buffer 206. The buffer 206 is connected via the reliability calculation unit 1201 and the label assignment unit 1202 to the correction unit 1105. The control unit 118 is bi-directionally connected to the luminance color-difference separation unit 1200, the reliability calculation unit 1201, and the label assignment unit 1202. The luminance color-difference separation unit 1200 reads two local regions from the extraction unit 111 to separate into the luminance signal and the color-difference signal on the basis of the control of the control unit 118. This is illustrated in FIGS. 14A and 14B according to the second embodiment. The luminance signal Y and the color-difference signals Cb and Cr in the target regions $R_{22}$, $G_{22}$, and $B_{22}$ are calculated by Expression (11). The luminance signals and the color-difference signals calculated from the two local regions are transferred to the buffer 201. On the basis of the control of the control unit 118, the noise calculation unit 202 reads the luminance signals from the buffer 201, reads the ISO sensitivity, the simplified white balance coefficient, and the exposure condition for each shooting operation from the control unit 118, and the temperature information from the temperature sensor 103, and calculates the noise amount for each pixel. The above-mentioned noise amounts are independently calculated for each of the two local regions. The noise calculation unit 202 compares the noise amounts between the calculated two local regions for each pixel unit and selects a larger one of the noise amounts to be transferred to the buffer 206. On the basis of the control of the control unit 118, the hue calculation unit 204 reads the color-difference signals from the buffer 201 and calculates the hue signal for each pixel on the basis of Expression (2). The above-mentioned hue signal is calculated only with respect to the local region of the image signal for the first time. The hue calculation unit 204 transfers the calculated hue signal to the buffer 206. The reliability calculation unit 1201 reads the noise amount Nij and the hue signal Hij (i=0 to 4, j=0 to 4) in the buffer 206 on the basis of the control of the control unit 118. After that, from the noise amount $N_{22}$ corresponding to the target region, a permissible range NA related to the noise amount is set.

$$NA = N_{22} \pm \Delta N \qquad (15)$$

Herein, $\Delta N$ denotes a predetermined noise amount. A pixel having the noise amount in the permissible range NA related to the noise amount is extracted as a similar region related to the noise. Also, from the hue signal $H_{22}$ corresponding to the target region, a permissible range NA related to the hue signal is set.

$$HA = H_{22} \pm \Delta H \qquad (16)$$

Herein, $\Delta H$ denotes a predetermined hue amount. A pixel having the hue signal in the permissible range NA related to the hue signal is extracted as a similar region related to the hue. According to the present embodiment, a numeric value related to the reliability such as the noise average value $N_{AV}$ according to the above-mentioned first embodiment is not directly calculated. Such a configuration is adopted that the permissible range related to the reliability shown in Expressions (15) and (16) is set, and the reliability is verified depending on whether the value belongs within the range. The extracted similar region related to the noise and similar region related to the hue are transferred to the label assignment unit 1202. On the basis of the control of the control unit 118, the label assignment unit 1202 performs an and processing (AND) on the similar region related to the noise from the reliability calculation unit 1201 and the similar region related to the hue. On the basis of the result, the pixel determined as the similar region in both the noise and the hue is assigned with a label 1, for example, as a region similar to the target region. On the other hand, the pixel not belonging to the similar region in the noise and the hue and the pixel only belonging to the similar region in one of the two is assigned with a label 0 as a region not similar to the target region. It should be noted that the target region is necessarily assigned with the label 1. The above-mentioned label information is transferred to the correction unit 1105.

FIGS. 21A to 21D are explanatory diagrams related to the above-mentioned label assignment. FIG. 21A illustrates an input image composed, for example, of three regions including (A) dark green, (B) white, and (C) light green. FIG. 21B illustrates the distribution of the noise amount and an extraction result of the similar region related to the noise. The amount of noise to be generated varies depending on the luminance level, and therefore (B) white and (C) light green have the same level of the noise amount, but (A) dark green has a different noise amount. As the noise is larger (visible), the color is darker, and when the noise distribution is represented, the light green part and the white part are not so distinguished from each other in terms of noise. For this reason, the region of (B) white and the region of (C) light green where the noise amount $N_{22}$ corresponding to the target region belongs are extracted as the similar regions. FIG. 21C is a distribution of hue H and illustrates the distribution of the hue signal and an extraction result of the similar region related to the hue. (A) Dark green and (B) white have a hue of a neutral gray system, and (C) light green has a green system hue. Dark green is close to black, and when being close to black, does not have many color components, and therefore is similar to white in terms of hue. For this reason, the region of (A) dark green and the region of (B) white where the hue signal $H_{22}$ corresponding to the target region belong are extracted as the similar regions. FIG. 21D illustrates a label assignment and a result in which the AND processing is performed between the similar region related to the noise illustrated in FIG. 21B and the similar region related to the hue illustrated in FIG. 21C and the region included in both the similar regions is assigned with the label 1 and other regions are assigned with the label 0. As a result, (B) white where the target region belongs is assigned with the label 1. The region assigned with the label 1 including the target pixel $H_{22}$ is separated by the correction unit 1105 in the next stage, and the average is calculated regarding the above-mentioned separated region. The pixel signals of the region equivalent to the part assigned with the label 1 are averaged to be set as the correction value with respect to the target region, and it is thus possible to reduce the influence of the noise in the estimation by the estimation unit 1106 in the later stage. In other words, after the target pixel which negatively affects the estimation in the correction unit 1105 is corrected, the estimation is performed in the estimation unit 1106.

FIG. 22 illustrates a configuration example of the correction unit 1105, in which the correction unit 113 illustrated in FIG. 4 according to the first embodiment is added with a region selection unit 1300, the smoothing unit 304 is replaced by an average calculation unit 1301 constituting smoothing processing means, and the signal separation unit 302 and the signal synthesis unit 306 are omitted. The basis configuration is equivalent to the correction unit 113 illustrated in FIG. 4, and the same configuration part will be allocated with the same name and reference numeral. Hereinafter, only a different part will be described.

In FIG. 22, the extraction unit 111 is connected via the buffer 303, the average calculation unit 1301, and the buffer 305 to the estimation unit 1106. The verification unit 1104 is connected to the region selection unit 1300, and the region selection unit 1300 is connected to the average calculation unit 1301. The control unit 118 is bi-directionally connected to the region selection unit 1300 and the average calculation unit 1301. On the basis of the control of the control unit 118, from the extraction unit 111, the local region composed of the RGB three signals of a 5×5 pixel size illustrated in FIG. 14A is transferred to the buffer 303. The above-mentioned local region exists in the image signal for the first time and the image signal for the second time. On the basis of the control of the control unit 118, the region selection unit 1300 reads the label information from the verification unit 1104. It should be noted that the above-mentioned label information is used commonly for the two local regions and the RGB three signals. The verification unit 1104 transfers the selection information to the average calculation unit 1301 so that the pixel assigned with the label information, according to the present embodiment, the level 1 is selected. On the basis of the control of the control unit 118, the average calculation unit 1301 reads the local regions from the buffer 303. At this time, on the basis of the selection information from the region selection unit 1300, only a similar region which is similar to the target region is read. An addition average processing is performed on the read similar region, and the average value is transferred as the correction value with respect to the target region to the buffer 305. The above-mentioned correction value is calculated for the RGB three signals in the two local regions. The target region corrected in the buffer 305 is transferred, as occasion demands, to the estimation unit 1106.

After the correction processing is ended in the correction unit 1105, as described in the first embodiment, the spectral characteristic of the subject is calculated, and also as described in the second embodiment, the spectral characteristic of the illumination light is calculated. After all the spectral characteristics including the spectral characteristic of the subject and the spectral characteristic of the illumination light are obtained, by using the thus obtained spectral characteristic in the color processing unit 1107, various adjustments (for example, the luminance adjustment, the hue adjustment, and the saturation adjustment) can be freely performed.

FIG. 23 illustrates a configuration example of the estimation unit 1106, in which the estimation unit 114 shown in FIG. 8 according to the first embodiment is added with a subject spectral characteristic calculation unit 1400, a subject basis vector ROM 1401, an illumination light weighting coefficient calculation unit 1402, an illumination light spectral characteristic calculation unit 1403, and an illumination light basis vector ROM 1404 constituting illumination light basis vector recording means. The basis configuration is equivalent to the estimation unit 114 illustrated in FIG. 8, and the same configuration part will be allocated with the same name and reference numeral. Hereinafter, only a different part will be described.

In FIG. 23, the correction unit 1105 is connected to the difference processing unit 400 and the illumination light weighting coefficient calculation unit 1402. The spectral characteristic ROM 403 is connected to the subject weighting coefficient calculating unit 402 and the illumination light weighting coefficient calculation unit 1402. The subject weighting coefficient calculating unit 402 is connected to the subject spectral characteristic calculation unit 1400 and the illumination light weighting coefficient calculation unit 1402. The subject spectral characteristic calculation unit 1400 is connected to the buffer 404. The illumination light weighting coefficient calculation unit 1402 is connected via the illumination light spectral characteristic calculation unit 1403 to the buffer 404. The buffer 404 is connected to the color processing unit 1107 and the output unit 117. The subject basis vector ROM 1401 is connected to the subject spectral characteristic calculation unit 1400, and the illumination light basis vector ROM 1404 is connected to the illumination light spectral characteristic calculation unit 1403. The control unit 118 is bi-directionally connected to the subject spectral characteristic calculation unit 1400, the illumination light weighting coefficient calculation unit 1402, and the illumination light spectral characteristic calculation unit 1403.

On the basis of the control of the control unit 118, the difference processing unit 400 reads the two target regions composed of the RGB three signals on which the correction processing is performed from the correction unit 1105. According to the present embodiment, the image signal from the CCD1 1100 having the normal spectral sensitivity characteristic is presumed as the image signals for the first time, and the image signal from the CCD2 1101 having the different spectral sensitivity characteristic is presumed as the image signal for the second time. The difference processing unit 400 performs the difference processing between the target region obtained from the image signal for the first time and the target region obtained from the image signal for the second time for each of R, Q and B signals. With this configuration, the RGB three signals $CS_R$, $CS_G$, and $CS_B$ are obtained which are equivalent to the case where the shooting is performed with the spectral sensitivity characteristic based on the difference in the spectral sensitivity characteristics between the CCD1 1100 and the CCD2 1101. The calculated RGB three signals $CS_R$, $CS_G$, and $CS_B$ are transferred to the buffer 401.

The spectral characteristic ROM 403 records the information related to the spectral characteristic of the image sensor system. As the spectral characteristics, the spectral sensitivity characteristic of the image sensor system $S_R(\lambda)$, $S_G(\lambda)$, and $S_B(\lambda)$, the three types of basis functions $O_1(\lambda)$, $O_2(\lambda)$, and $O_3(\lambda)$ for approximating the spectral reflectance characteristic of the subject $O(\lambda)$, the three types of basis functions $I_1(\lambda)$, $I_2(\lambda)$, and $I_3(\lambda)$ for approximating the spectral emissivity characteristic of the illumination light $I(\lambda)$, and the inverse matrix of the system matrix in the image sensor system $Sys^{-1}$ illustrated in Expression (6) are recoded. It should be noted that the characteristic of the spectral emissivity characteristic of the flash lamp light IS $(\lambda)$ in the system matrix in the above-mentioned Expression (6) is replaced by the spectral sensitivity characteristic based on the difference in the spectral sensitivity characteristics between the CCD1 1100 and the CCD2 1101 according to the present embodiment.

On the basis of the control of the control unit 118, the subject weighting coefficient calculating unit 402 reads the RGB three signals $CS_R$, $CS_G$, and $CS_B$ on which the difference processing is performed from the buffer 401, the inverse matrix of the system matrix $Sys^{-1}$ from the spectral characteristic ROM 403, and calculates the weighting coefficients with respect to the basis functions $o_1$, $o_2$, and $o_3$ on the basis of Expression (6). The calculated above-mentioned weighting coefficients are transferred to the subject spectral characteristic calculation unit 1400 and the illumination light weighting coefficient calculation unit 1402. The subject basis vector ROM 1401 records the three types of basis functions $O_1(\lambda)$, $O_2(\lambda)$, and $O_3(\lambda)$ for approximating the spectral reflectance characteristic of the subject $O(\lambda)$, and the above-mentioned basis functions are transferred to the subject spectral characteristic calculation unit 1400. On the basis of the control of the control unit 118, the subject spectral characteristic calculation unit 1400 reads the weighting coefficients $o_1$, $o_2$, and $o_3$ from the subject weighting coefficient calculating unit 402, reads the basis functions $O_1(\lambda)$, $O_2(\lambda)$, and $O_3(\lambda)$ from the subject basis vector ROM 1401, and calculates the spectral reflectance characteristic of the subject $O(\lambda)$ on the basis of Expression (5). The calculated spectral reflectance characteristic of the subject $O(\lambda)$ is transferred to the buffer 404.

On the other hand, the illumination light weighting coefficient calculation unit 1402 reads the image signals for the first time $CL_R$, $CL_G$, and $CL_B$ from the correction unit 1105 on the basis of the control of the control unit 118. The image signal for the first time is an image signal captured by the CCD1 1100 having the normal spectral sensitivity characteristic. Also, the weighting coefficients $o_1$, $o_2$, and $o_3$ are read from the subject weighting coefficient calculating unit 402, the spectral sensitivity characteristic of the image sensor system $S_R(\lambda)$, $S_G(\lambda)$, and $S_B(\lambda)$, the basis functions for the subject $O_1(\lambda)$, $O_2(\lambda)$, and $O_3(\lambda)$, and the basis functions for the illumination light $I_1(\lambda)$, $I_2(\lambda)$, and $I_3(\lambda)$ are read from the spectral characteristic ROM 403. After that, on the basis of Expression (14), the weighting coefficients with respect to the basis functions $i_1$, $i_2$, and $i_3$ are calculated. The above-mentioned calculated weighting coefficients are transferred to the illumination light spectral characteristic calculation unit 1403. The illumination light basis vector ROM 1404 records the three types of basis functions $I_1(\lambda)$, $I_2(\lambda)$, and $I_3(\lambda)$ for approximating the spectral emissivity characteristic of the illumination light $I(\lambda)$, and the above-mentioned basis functions are transferred to the illumination light spectral characteristic calculation unit 1403.

On the basis of the control of the control unit 118, the illumination light spectral characteristic calculation unit 1403 reads the weighting coefficients $i_1$, $i_2$, and $i_3$ from the illumination light weighting coefficient calculation unit 1402, reads the basis functions $I_1(\lambda)$, $I_2(\lambda)$, and $I_3(\lambda)$ from the illumination light basis vector ROM 1404, and calculates, on the basis of Expression (13), the spectral emissivity characteristic of the illumination light of the subject $I(\lambda)$. The calculated spectral emissivity characteristic of the illumination light $I(\lambda)$ is transferred to the buffer 404. The spectral reflectance characteristic of the subject $O(\lambda)$ in the buffer 404 and the spectral emissivity characteristic of the illumination light $I(\lambda)$ are transferred to the color processing unit 1107. Also, as occasion demands, the transfer to the output unit 117 can also be performed. It should be noted that according to the above-mentioned configuration of the estimation unit 1106, the spectral characteristics necessary for the processing are separated into the three places including the spectral characteristic ROM 403, the subject basis vector ROM 1401, and the illumination light basis vector ROM 1404 for convenience of the description, and a part of the information is recorded in an overlapping manner, but a configuration of integrating into one ROM can also be adopted.

FIG. 24 illustrates a configuration example of the color processing unit 1107, in which the color processing unit 115 illustrated in FIG. 10 according to the first embodiment is added with a luminance adjustment unit 1500, a hue adjustment unit 1501, and a saturation adjustment unit 1502, and the combining unit 503 is omitted. The basis configuration is equivalent to the color processing unit 115 illustrated in FIG. 10, and the same configuration part will be allocated with the same name and reference numeral. Hereinafter, only a different part will be described.

In FIG. 24, the estimation unit 1106 is connected via the luminance adjustment unit 1500, the hue adjustment unit 1501, and the saturation adjustment unit 1502 to the reproduced color calculation unit 500. The reproduced color calculation unit 500 is connected to the signal processing unit 116. The control unit 118 is bi-directionally connected to the luminance adjustment unit 1500, the hue adjustment unit 1501, and the saturation adjustment unit 1502.

The luminance adjustment unit 1500 reads the spectral reflectance characteristic of the subject O ($\lambda$) from the estimation unit 1106 to be multiplied by a predetermined coefficient $k_L$ ($k_L$ is a real number equal to or larger than 0) on the basis of the control of the control unit 118. With this configuration, it is possible to adjust the luminance level. It should be noted that in a case where the spectral reflectance characteristic O ($\lambda$) exceeds the upper limit of 1.0, the spectral reflectance characteristic is replaced by 1.0. The spectral reflectance characteristic O ($\lambda$) in which the luminance level is adjusted is transferred to the hue adjustment unit 1501.

The hue adjustment unit 1501 reads the spectral reflectance characteristic O ($\lambda$) in which the luminance level is adjusted from the luminance adjustment unit 1500 on the basis of the control of the control unit 118. With respect to the above-mentioned spectral reflectance characteristic O ($\lambda$), a predetermined hue range, for example, a hue range equivalent to a skin color is shifted in a wavelength direction by kc (kc is a negative or positive real number) in parallel. With this configuration, it is possible to put the predetermined hue range close to an arbitrary hue. Also, in order to secure a continuity of the hue, both ends of the hue range to be adjusted are provided with an adjustment range, and by compressing or extending the adjustment range, the continuity of the hue is secured. The above-mentioned hue adjustment can be performed in a plurality of hue regions. The spectral reflectance characteristic O ($\lambda$) in which the hue is adjusted is transferred to the saturation adjustment unit 1502.

The saturation adjustment unit 1502 reads the spectral reflectance characteristic O ($\lambda$) in which the hue is adjusted from the hue adjustment unit 1501 on the basis of the control of the control unit 118. With respect to the above-mentioned spectral reflectance characteristic O ($\lambda$), the saturation is adjusted by sharpening or smoothing the curve. The sharpening or smoothing processing is executed by using a known corrugating processing. Sharpening the curvature means the increase in the saturation, and smoothing the curve means the decrease in the saturation. The above-mentioned saturation adjustment can be performed on all the hue regions and only on a particular hue region. The spectral reflectance characteristic O ($\lambda$) in which the hue adjustment is performed is transferred to the reproduced color calculation unit 500.

The reproduced color calculation unit 500 calculates the reproduced colors $CA_R$, $CA_G$, and $CA_B$ under the arbitrary light source on the basis of Expression (7) similarly to the first embodiment. It should be noted that $\Sigma oiOi$ ($\lambda$) representing the spectral reflectance characteristic of the subject in Expression (7) is replaced by the spectral reflectance characteristic of the subject O ($\lambda$) in which the adjustments in the luminance, in the hue, and the saturation from the saturation adjustment unit 1502 are completed. The calculated reproduced colors $CA_R$, $CA_G$, and $CA_B$ are transferred to the signal processing unit 116. It should be noted that in the above-mentioned configuration of the color processing unit 1107, only the spectral reflectance characteristic of the subject O ($\lambda$) is used, and the spectral emissivity characteristic of the illumination light I ($\lambda$) is not used, but is not necessarily limited to the above. For example, similarly to the first embodiment, such a configuration can also be adopted that the spectral emissivity characteristic of the light source IA ($\lambda$) recorded in the illumination light ROM 502 is combined with the estimated spectral emissivity characteristic of the illumination light I ($\lambda$), and a subjectively preferable image is obtained.

With the above-mentioned configuration, the reliability is calculated on the basis of the noise and the hue included in the image signal, and after the average processing is performed on the similar regions selected on the basis of the reliability, the estimation for the spectral characteristic is performed. For this reason, it can be guaranteed that the estimation accuracy for the spectral characteristic is set within an appropriate range. Also, as the plurality of image signals having the different spectral characteristics are obtained in the one shooting operation by using the plurality of color image sensor systems having different spectral characteristics, it is possible to perform the estimation for spectral characteristics also regarding the moving body with the high accuracy. Also, modeling of the spectral characteristic that should be estimated is performed through linear combination of a small number of basis functions and the weighting coefficients related to the above-mentioned basis functions are calculated, it is possible to estimate the spectral characteristic of the subject by using the conventional color image sensor system. Also, the weighting coefficient has the small capacity, which is advantageous in the saving or transferring operation. Furthermore, the spectral characteristics of the subject and the illumination light are obtained, which facilitates the color processing in the later stage and utilization to another purpose. Also, by using the estimated spectral characteristic, the luminance adjustment, the hue adjustment, and the saturation adjustment are performed, so that it is possible to perform the high accuracy adjustment.

It should be noted that according to the above-mentioned embodiment, the Bayer-type primary color filter is used for the image pickup device, but the configuration is not necessarily limited to the above. Similarly to the first embodiment, the color-difference line-sequential type complementary color filter can also be used. Also, the two sheets of image signals captured by the separate image pickup unit can be processed in an unprocessed Raw data mode, and further processed from the recording medium such as the memory card in which the additional information such as the image pickup condition and the spectral characteristic related to the image sensor system is recorded in the header part.

Furthermore, according to the above-mentioned embodiment, the processing based on hardware is presumed, but is not necessarily limited to the above. For example, such a configuration can also be adopted that the two types of image signals from the CCD1 1100 and the CCD2 1101 are unprocessed and outputted as Raw data, the image pickup condition, the spectral characteristic related to the image sensor system, and the like from the control unit 118 are outputted as the header information, and the information is processed by separate software.

FIG. 25A illustrates a flowchart related to a software processing of a signal processing according to the third embodiment of the present invention. FIG. 25A is a flow of the entire processing. It should be noted that that the same processing step S as that in the flowchart for the signal processing according to the first embodiment shown in FIG. 12A is allocated with the same reference numeral. In step S1, the two types of image signals and the header information such as the image pickup condition and the spectral characteristic related to the image sensor system are read. In step S80, the interpolation processing is performed and a three image signal is generated. In step S2, the local regions including the target region shown in FIG. 14A are sequentially extracted from the two types of image signals. In step S81, the reliability is calculated as will be separately described. In step S82, the image signal is corrected on the basis of the reliability as will be separately described. In step S83, the spectral characteristic is estimated as will be separately described. In step S84, the color processing is performed on the basis of the estimated spectral characteristic as will be separately described. In step S7, it is determined whether the extraction for all the local regions is completed, and in a case where the extraction is not completed, the flow is branched to step S2, and in a case where the extraction is completed, the flow is branched to step S8. In step S8, a known edge emphasis processing, a known compression processing, or the like is performed. In step S9, the signal after the processing is outputted to end.

FIG. 25B is a flowchart related to the reliability verification in the above-mentioned step S81. It should be noted that the same processing step S as that in the flowchart for the reliability verification the first embodiment shown in FIG. 12B is allocated with the same reference numeral. In step S90, the luminance signal and the color-difference signal illustrated in FIG. 14B are calculated from the local region on the basis of Expression (11). In step S21, as illustrated in FIG. 21B, on the basis of the luminance signal, the noise amount related to the local region is calculated for each pixel unit. The above-mentioned noise amounts are independently calculated for each of the two local regions and a larger one of the noise amounts is selected. In step S23, as illustrated in FIG. 21C, on the basis of the color-difference signal, the hue signal related to the local region of the image signals for the first time is calculated for each pixel unit. It should be noted that the hue signal is calculated through Expression (2). In step S91, the similar region related to the noise is calculated on the basis of Expression (15), the similar region related to the hue is calculated on the basis of Expression (16), and the AND processing is performed to calculate the similar region with the high reliability. In step S92, the label is assigned on the basis of the above-mentioned similar region as illustrated in FIG. 21D.

FIG. 25C is the flowchart related to the image signal correction in the above-mentioned step S82. In step S100, the similar region is selected on the basis of the label. In step S101, the average value in the selected similar region is calculated.

FIG. 25D is the flowchart related to the spectral characteristic estimation in the above-mentioned step S83. It should be noted that the same processing step as that in the flowchart for the spectral characteristic estimation according to the first embodiment shown in FIG. 12D is allocated with the same reference numeral. In step S40, the difference processing is performed between the two target regions. In step S41, the spectral sensitivity characteristic of the image sensor system, the three types of basis functions for approximating the spectral reflectance characteristic of the subject, the three types of basis functions for approximating the spectral emissivity characteristic of the illumination light, and the inverse matrix of the system matrix in the image sensor system illustrated in Expression (6) are read. In step S42, on the basis of Expression (6), the weighting coefficients with respect to the basis functions for approximating the spectral reflectance characteristic of the subject are calculated. In step S110, on the basis of Expression (5), the spectral reflectance characteristic of the subject is calculated. In step S111, on the basis of Expression (14), the weighting coefficients with respect to the basis functions for approximating the spectral emissivity characteristic of the illumination light are calculated. In step S112, on the basis of Expression (13), the spectral emissivity characteristic of the illumination light of the subject is calculated.

FIG. 25E is a flowchart related to the color processing in the above-mentioned step S84. It should be noted that the same processing step S as that in the flowchart for the color processing according to the first embodiment shown in FIG. 12E is allocated with the same reference numeral. In step S120, by multiplying the spectral reflectance characteristic of the subject with a predetermined coefficient, the luminance level is adjusted. In step S121, with respect to the spectral reflectance characteristic of the subject in which the luminance level is adjusted, the predetermined hue range is shifted in the wavelength direction in parallel to perform the adjustment on the predetermined hue range. In step S122, with respect to the spectral reflectance characteristic in which the adjustment is performed on the hue, the saturation is adjusted by sharpening or smoothing the curve. In step S50, the spectral sensitivity characteristic of the image sensor system and the three types of basis functions for approximating the spectral reflectance characteristic of the subject are read. In step S51, the spectral emissivity characteristic of the light source is read. In step S52, the reproduced colors are calculated on the basis of Expression (7).

The present invention can be widely utilized for the image pickup system such as a digital camera requiring the measurement and estimation of the spectral characteristic.

The present invention is not limited to the above-mentioned embodiments, and various modifications and alterations may be made insofar as they do not change the gist of the present invention.

What is claimed is:

1. An image pickup system comprising:
   a verification unit for verifying reliability of a plurality of image signals obtained by at least one color image sensor system with different spectral characteristics of the at least one color image sensor system;
   a correction unit for performing a correction processing on the plurality of image signals on the basis of the reliability; and
   an estimation unit for performing an estimation for an unknown spectral characteristic related to a subject or an illumination light on the basis of the plurality of image signals on which the correction processing is performed.

2. The image pickup system according to claim 1, further comprising:
   a control unit for performing a control to change a predetermined spectral characteristic in one color image sensor system in a time series manner and cause a plurality of image pickup operations; wherein
   the verification unit verifies the reliability of the plurality of image signals obtained from the plurality of image pickup operations.

3. The image pickup system according to claim 1,
wherein the verification unit comprises at least one of:
a noise amount calculation unit for calculating a noise amount for each predetermined region unit from the plurality of image signals;
an edge amount calculation unit for calculating an edge amount for each predetermined region unit from the plurality of image signals;
a hue information calculation unit for calculating information related to a hue for each predetermined region unit from the plurality of image signals; and
a motion amount calculation unit for calculating a motion amount of the subject for each predetermined region unit from the plurality of image signals.

4. The image pickup system according to claim 3,
wherein the verification unit further comprises a reliability calculation unit for calculating the reliability of the plurality of image signals on the basis of at least one of the information related to the noise amount, the edge amount, the hue, and the motion amount.

5. The image pickup system according to claim 1,
wherein the correction unit comprises:
a filter recording unit for recording a plurality of smoothing filters having different frequency characteristics;
a filter selection unit for selecting the smoothing filter on the basis of the reliability; and
a smoothing processing unit for performing a smoothing processing on the plurality of image signals by using the selected smoothing filter.

6. The image pickup system according to claim 1,
wherein the correction unit comprises:
an extraction unit for extracting a local region with a predetermined size including a target region from the plurality of image signals;
a region selection unit for selecting a region similar to the target region from the local region on the basis of the reliability; and
a smoothing processing unit for performing a smoothing processing on the selected region.

7. The image pickup system according to claim 1,
wherein the correction unit comprises:
a reduction rate selection unit for selecting a reduction rate on the basis of the reliability; and
a reduction processing unit for performing a reduction processing on the plurality of image signals by using the reduction rate.

8. The image pickup system according to claim 1,
wherein the estimation unit comprises:
a spectral characteristic recording unit for recording a spectral characteristic related to the color image sensor system;
a difference processing unit for performing a difference processing between the plurality of image signals; and
a subject weighting coefficient calculation unit for calculating a weighting coefficient related to a spectral characteristic of the subject on the basis of the image signal on which the difference processing is performed and the spectral characteristic related to the color image sensor system.

9. The image pickup system according to claim 8,
wherein the estimation unit further comprises:
a subject basis vector recording unit for recording a predetermined number of basis vectors used for the estimation for the spectral characteristic of the subject; and
a subject spectral characteristic calculation unit for calculating the spectral characteristic of the subject on the basis of the basis vectors of the subject and the weighting coefficient related to the spectral characteristic of the subject.

10. The image pickup system according to claim 8,
wherein the estimation unit further comprises:
an illumination light weighting coefficient calculation unit for calculating a weighting coefficient related to the spectral characteristic of the illumination light on the basis of the image signals, the weighting coefficient related to the spectral characteristic of the subject, and the spectral characteristic related to the color image sensor system.

11. The image pickup system according to claim 10,
wherein the estimation unit further comprises:
an illumination light basis vector recording unit for recording a predetermined number of basis vectors used for the estimation for a spectral characteristic of the illumination light; and
an illumination light spectral characteristic calculation unit for calculating the spectral characteristic of the illumination light on the basis of the basis vectors of the illumination light and the weighting coefficient related to the spectral characteristic of the illumination light.

12. The image pickup system according to claim 7,
wherein the estimation unit comprises:
an expansion processing unit for performing, after the spectral characteristic related to the subject or the illumination light is estimated on the basis of the image signal on which the reduction processing is performed, an expansion processing to set the estimated spectral characteristic to have the same size as the image signal from the color image sensor system.

13. The image pickup system according to claim 1, further comprising:
a color processing unit for performing a color processing on at least one of the plurality of image signals on the basis of the estimated spectral characteristic of the subject or the illumination light.

14. The image pickup system according to claim 13,
wherein the color processing unit comprises:
a spectral characteristic recording unit for recording a spectral characteristic of the color image sensor system;
an illumination light recording unit for recording a spectral characteristic of a predetermined illumination light; and
a reproduced color calculation unit for calculating a reproduced color of the image signal in the illumination light on the basis of the spectral characteristic related to the color image sensor system, the spectral characteristic of the illumination light, and the estimated spectral characteristic related to the subject.

15. The image pickup system according to claim 14,
wherein the color processing unit further comprises:
a combining unit for combining the image signal calculated by the reproduced color calculation unit with the image signal from the color image sensor system at a predetermined ratio.

16. The image pickup system according to claim 15,
wherein the color processing unit comprises at least one of:
a luminance adjustment unit for multiplying the estimated spectral characteristic related to the subject by a predetermined coefficient;
a hue adjustment unit for shifting the estimated spectral characteristic related to the subject in a predetermined wavelength range in a wavelength direction in parallel; and a saturation adjustment unit for changing a curvature with respect to the estimated spectral characteristic related to the subject.

17. The image pickup system according to claim 2, wherein the control unit comprises:
an illumination unit whose spectral characteristic is known; and
an illumination control unit for controlling an operation of the illumination unit.

18. The image pickup system according to claim 2, wherein the control unit comprises:
a filter unit whose spectral characteristic is known; and
a filter control unit for controlling an operation of inserting the filter unit into a light path of the color image sensor system.

19. The image pickup system according to claim 1, wherein as the color image sensor system, a single image pickup device in which an R (red), G (green), and B (blue) Bayer-type primary color filter is arranged on a front face or a single image pickup device in which a Cy (cyan), Mg (magenta), Ye (yellow), and G (green) color-difference line-sequential type complementary color filter is arranged on a front face is used.

20. A computer-readable recording device recording program for instructing a computer to execute program instructions that when executed on the computer cause the computer to carry out the steps of:
verifying reliability of a plurality of image signals obtained by at lease one color image sensor system with different spectral characteristics of the at least one color image sensor system;
performing a correction processing on the plurality of image signals on the basis of the reliability; and
performing an estimation for an unknown spectral characteristic related to a subject or an illumination light on the basis of the plurality of image signals on which the correction processing is performed.

21. The computer readable recording device according to claim 20,
wherein the step of verifying reliability comprises at least one of:
calculating a noise amount for each predetermined region unit from the plurality of image signals;
calculating an edge amount for each predetermined region unit from the plurality of image signals;
calculating information related to a hue for each predetermined region unit from the plurality of image signals; and
calculating a motion amount for each predetermined region unit from the plurality of image signals.

22. The image pickup program computer readable recording device according to claim 21,
wherein the of verifying reliability further comprises calculating a reliability related to the plurality of image signals on the basis of at least one of the information related to the noise amount, the edge amount, the hue, and the motion amount.

23. The computer readable recording device according to claim 20,
wherein the correction processing comprises:
recording a plurality of smoothing filters having different frequency characteristics;
selecting the smoothing filter on the basis of the reliability; and
performing a smoothing processing on the plurality of image signals by using the selected smoothing filter.

24. The image pickup program according to claim 20,
wherein the correction function comprises:
a function of extracting a local region with a predetermined size including a target region from the plurality of image signals;
a function of selecting a region similar to the target region from the local region on the basis of the reliability; and
a function of performing a predetermined smoothing processing on the selected region.

25. The image pickup program according to claim 20,
wherein the correction function comprises:
a function of selecting a reduction rate on the basis of the reliability; and
a function of performing a reduction processing on the plurality of image signals by using the reduction rate.

26. The computer readable recording device according to claim 20, wherein the program instructions, when executed on the computer, cause the computer to carry out the step of:
performing a color processing on at least one of the plurality of image signals on the basis of the estimated spectral characteristic of the subject or the illumination light.

27. The image pickup system according to claim 1, wherein the verification unit obtains the plurality of image signals through a plurality of color image sensor systems having different spectral characteristics and verifies the reliability of the obtained plurality of image signals.

28. The image pickup system according to claim 4, wherein the reliability calculation unit calculates the reliability of image signals on the basis of the edge amount, and
wherein when the edge amount is larger, an accuracy in the estimation for the unknown spectral characteristic is decreased.

* * * * *